United States Patent
Hiromasa et al.

(10) Patent No.: US 9,518,559 B2
(45) Date of Patent: Dec. 13, 2016

(54) OUTPUT CONTROL DEVICE, METHOD AND PROGRAM FOR WIND FARM

(71) Applicant: KABUSHIKI KAISHA TOSHIBA, Minato-ku (JP)

(72) Inventors: Katsutoshi Hiromasa, Fuchu (JP); Yoko Kosaka, Nakano (JP); Kenichi Tanomura, Fuchu (JP); Toshimasa Yamada, Yokohama (JP); Yoichi Tone, Suginami (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 163 days.

(21) Appl. No.: 14/677,226

(22) Filed: Apr. 2, 2015

(65) Prior Publication Data
US 2015/0285220 A1 Oct. 8, 2015

(30) Foreign Application Priority Data
Apr. 3, 2014 (JP) .................... 2014-077381

(51) Int. Cl.
F03D 9/00 (2016.01)
F03D 7/00 (2006.01)
(Continued)

(52) U.S. Cl.
CPC .............. *F03D 7/00* (2013.01); *F03D 7/048* (2013.01); *F03D 9/003* (2013.01); *F03D 9/005* (2013.01);
(Continued)

(58) Field of Classification Search
CPC .................. H02J 3/18; H02J 3/46; F03D 7/00; F03D 9/005; F03D 7/048
(Continued)

(56) References Cited

U.S. PATENT DOCUMENTS

| | | | | |
|---|---|---|---|---|
| 4,994,684 A | * | 2/1991 | Lauw | ......................... H02P 9/42 290/40 C |
| 7,430,545 B2 | * | 9/2008 | Kanbara | ................ G06Q 30/00 700/291 |

(Continued)

FOREIGN PATENT DOCUMENTS

| | | |
|---|---|---|
| EP | 1 841 036 A2 | 10/2007 |
| EP | 2 393 179 A2 | 12/2011 |

(Continued)

OTHER PUBLICATIONS

Extended Search Report issued Aug. 14, 2015 in European patent Application No. 15155514.1.

(Continued)

*Primary Examiner* — Julio Gonzalez Ramirez
(74) *Attorney, Agent, or Firm* — Oblon, McClelland, Maier & Neustadt, L.L.P.

(57) ABSTRACT

An output by a wind farm including multiple wind power generation devices is controlled by an output control device. To control the output, (1) a potential estimator estimates an outputtable maximum power amount by each wind power generation device, (2) a control amount determiner determines a control amount of the whole wind farm based on the maximum power amount estimated by the potential estimator, (3) a control timing adjuster adjusts a control timing of the control amount of the whole wind farm, (4) a control amount distributer distributes the control amount having undergone the control timing adjustment based on an available power generation amount of each wind power generation device.

15 Claims, 14 Drawing Sheets

(51) Int. Cl.
*F03D 7/04* (2006.01)
*H02J 3/38* (2006.01)

(52) U.S. Cl.
CPC .......... *H02J 3/386* (2013.01); *F05B 2260/821* (2013.01); *F05B 2270/335* (2013.01); *F05B 2270/404* (2013.01); *Y02E 10/721* (2013.01); *Y02E 10/722* (2013.01); *Y02E 10/723* (2013.01); *Y02E 10/725* (2013.01); *Y02E 10/763* (2013.01)

(58) Field of Classification Search
USPC ....... 290/55, 44; 700/287, 286; 307/155, 69, 307/43
See application file for complete search history.

(56) References Cited

U.S. PATENT DOCUMENTS

| | | | |
|---|---|---|---|
| 7,805,222 B2 | 9/2010 | Jurkat | |
| 8,301,313 B2 | 10/2012 | Wobben | |
| 2008/0150283 A1* | 6/2008 | Rivas | H02J 3/1885 290/44 |
| 2010/0025994 A1* | 2/2010 | Cardinal | F03D 7/0284 290/44 |
| 2012/0101643 A1* | 4/2012 | Kirchner | F03D 7/0284 700/287 |
| 2013/0175870 A1* | 7/2013 | Fortmann | F03D 9/005 307/84 |
| 2015/0088326 A1* | 3/2015 | Fortmann | F03D 7/043 700/287 |
| 2015/0275862 A1* | 10/2015 | Babazadeh | H02J 3/18 290/44 |
| 2015/0295529 A1* | 10/2015 | Rose, Jr. | H02P 9/305 290/44 |

FOREIGN PATENT DOCUMENTS

| | | | |
|---|---|---|---|
| JP | 2007-032488 A | | 2/2007 |
| JP | 2007-32488 A | * | 2/2007 |
| JP | 2007-037226 A | | 2/2007 |
| JP | 2009-239990 A | | 10/2009 |
| JP | 4881349 B2 | | 2/2012 |
| WO | WO 2013/160486 A2 | | 10/2013 |

OTHER PUBLICATIONS

Zbigniew Lubosny et al: "Supervisory Control of a Wind Farm",IEEE Transactions on Power Systems, IEEE Service Center, Piscataway, NJ, US, vol. 22, No. 3, XP011189262, Aug. 2007 (2007), pp. 985-994.

"System connection technology requirement of wind power generation facilities (for extremely high voltage)", Tohoku-Electric Power Co., Inc., Dec. 2011, 68 Pages.

"Wind Turbines—Part 25-2: Communications for monitoring and control of wind power plants—Information models", Annex C, Standard No. IEC61400-25-2, Dec. 14, 2006, pp. 76-81.

\* cited by examiner

OUTPUT CONTROL DEVICE, METHOD AND PROGRAM FOR WIND FARM

CROSS-REFERENCE TO RELATED APPLICATION(S)

This application is based upon and claims the benefit of priority from Japan Patent Application No. 2014-077381, filed on Apr. 3, 2014, the entire contents of which are incorporated herein by reference.

TECHNICAL FIELD

The disclosure of this application relates to an output control device, a method and a program for a wind farm.

BACKGROUND

In view of the depletion of fossil fuels and the prevention of a global warming, introduction of power generation systems utilizing natural energy (e.g., wind power and solar power) is advancing worldwide. A wind power generation device converts energy possessed by wind into rotation energy through a wind turbine, and transmits such energy to a power generator directly or with an increase in the rotation speed by a speed-up gear, thereby generating electrical energy. A wind farm is a system for generating large power by placing wind power generation devices of several tens to a hundred or more on a broad land or on the broad ocean.

When the scale increases, a wind farm affects a stable operation of a power system, and thus an output control performance and a system interconnection management equivalent to those of a thermal power generation plant are required. System interconnection requirements to interconnect a wind farm with a commercial system are defined by respective electric power companies and national standards.

A thermal power generation plant or a water power generation plant connected to a power system controls the frequency of power output by a generator to be within a certain range. When a wind farm having a characteristic of changing the frequency of power output by a generator in accordance with wind power is interconnected with such a power system, a load on the frequency control in the power system increases. The frequency maintaining performance decreases in the night when the thermal and water power generators in the power system are deactivated, and it sometimes becomes necessary to parallel off the wind farm.

The fluctuation originating from the wind farm also causes a voltage fluctuation at a connection point, which deteriorates the power quality. Hence, as to the output by the power generator of the wind farm, a control of ensuring a spinning reserve to be maintained, i.e., a performance that can increase supplied power to a system when a disturbance like a breakdown occurs in an interconnected power system is performed. By maintaining the spinning reserve, the wind farm can be operated as a power plant that can contribute to the system stabilization.

For a power producer possessing a wind farm, it becomes possible to increase the operating rate while avoiding unnecessary parallel off, and further to contribute to the system stabilization when a breakdown of a power system occurs by controlling the wind farm output so as to satisfy the system interconnection requirement.

Non-Patent Document 1: "System Connection Technology Requirement of Wind Power Generation Facilities (for extremely high voltage)", December, 2011, Tohoku-Electric Power Co., Inc.

Non-Patent Document 2: Standard Number IEC61400-25-2 (Wind Turbines-Part 25-2: Communications for monitoring and control of wind power plants-Information models) Annex C, 2006 Dec. 14.

Patent Document 1: JP 2009-239990 A
Patent Document 2: JP 2007-32488 A
Patent Document 3: JP 2007-37226 A
Patent Document 4: JP 4881349 B In order to operate the wind farm, it is desirable to set the control amount of each wind power generation device in the wind farm. In order to do so, a technology is known which calculates a control amount of the whole wind farm based on the output value of the wind farm and the output target value thereof, and which obtains the control amount of each wind power generation device in the wind farm based on the whole control amount. However, the calculation result that is the control amount of the whole wind farm usually contains various delay components.

For example, the output value of the wind farm is measured at a connection point between the wind farm and the power system, and is transmitted to a control device performing a calculation. Hence, the output value of the wind farm utilized for the calculation by the control device contains delay components at the time of transmission. Therefore, the control amount of the whole wind farm calculated based on the output value containing the delay components at the time of transmission also contains delay components.

In the calculation of the control amount of the whole wind farm, delay is inevitably caused by such a calculation. That is, the control amount of the whole wind farm which is a calculation result contains delay components inherent to the calculation.

The disclosure of the present application has been made to address the aforementioned technical disadvantages, and it is an objective to provide, for a wind farm, an output control device, a method, and a program which compensate delay components contained in a calculation result in the calculation of a control amount of the wind farm, and which distribute a control amount within an outputtable range of a wind power generation device in accordance with the present condition of wind based on a control amount of the whole wind farm having undergone the compensation of delay components.

SUMMARY

An output control device for a wind farm according to an embodiment of the present disclosure includes the following features:

(1) A potential estimator estimating an outputtable maximum power amount by each wind power generation device;

(2) A control amount determiner determining a control amount of the wind farm based on the maximum power amount estimated by the potential estimator;

(3) A control timing adjuster adjusting a control timing of the control amount of the wind farm; and (4) A control amount distributor distributing the control amount having undergone the control timing adjustment based on an available power generation amount of each wind power generation device.

An output control method and an output-control-device control program realizing the aforementioned output control device for a wind farm are also embodiments of the present disclosure.

DETAILED DESCRIPTION

[1. First Embodiment]
[1-1. Structure]

Figure 1:
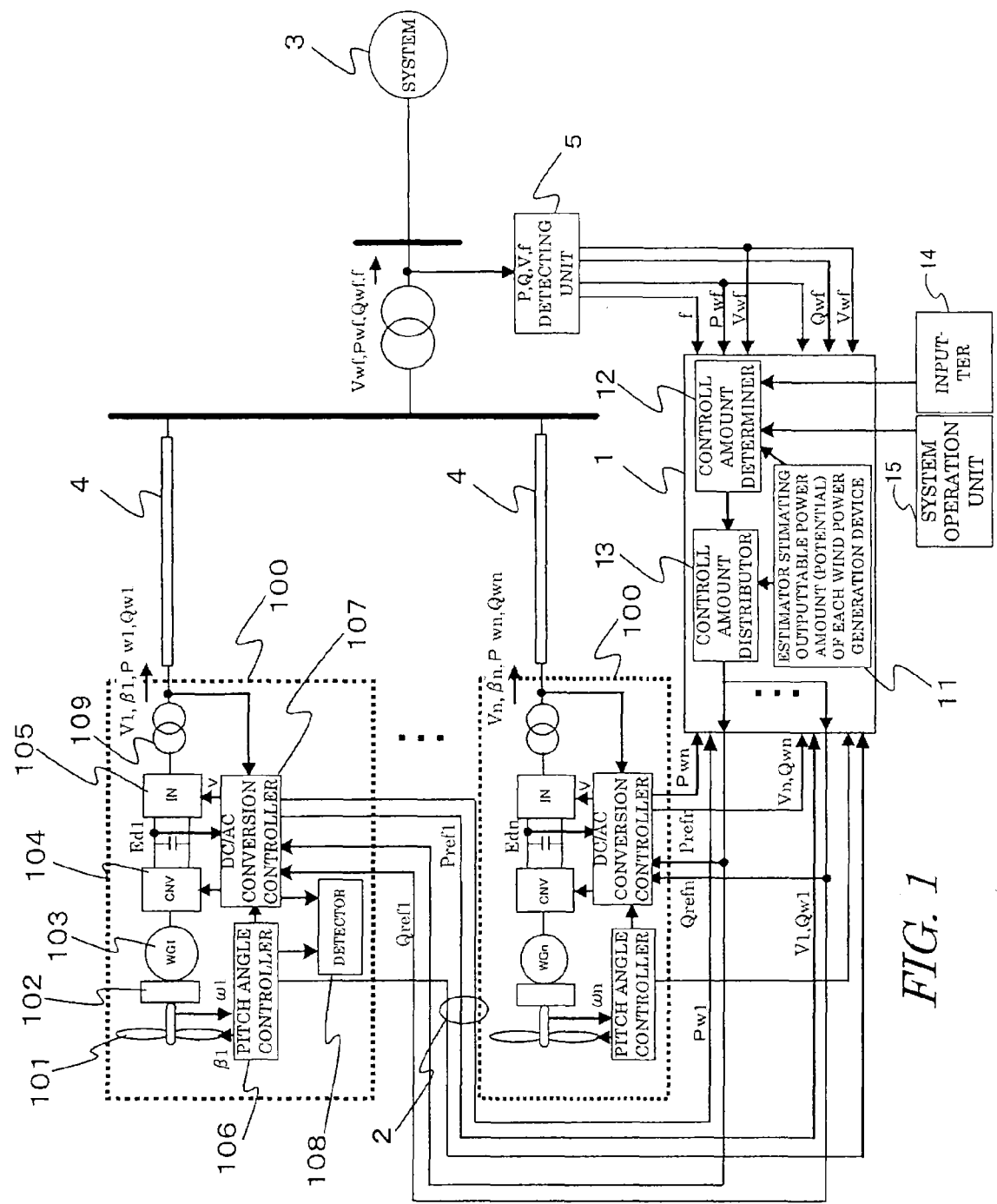
FIG. 1 is a block diagram illustrating a structure of an output control device for a wind farm according to a first embodiment.

A detailed explanation will be given of an output control device for a wind farm according to a first embodiment with reference to FIG. 1. FIG. 1 is a block diagram illustrating the output control device for a wind farm according to this embodiment.

The wind farm of this embodiment includes n number of wind power generation devices 100(1 to n), an output control device 1 of the wind power generation devices 100, and a system 3 receiving output by each wind power generation device 100.

The wind power generation devices 100 are each a power generation device that generates power by wind energy. The output control device 1 controls the power generation amount of the wind power generation device 100. The wind power generation device 100 and the output control device 1 are connected together via a control line 2, and the wind power generation device 100 controls the own power generation amount based on an instruction on a control amount from the output control device 1.

Each wind power generation device 100 is connected to the system 3 via a power line 4. The power generated by the wind power generation device 100 is output to the system 3 through the power line 4. A supplied power data detecting unit 5 is provided at a connection point between the power line 4 and the system 3. The supplied power data detecting unit 5 detects supplied power data on various kinds of electric quantities supplied from the power line 4 to the system 3.

1. Structure of Wind Power Generation Device 100

The wind power generation device 100 employs the following structures:

(1) Blades 101 having a variable pitch angle;

(2) A turbine 102 having a rotation shaft rotated by wind received by the blades 101;

(3) A power generator 103 that converts the rotation of the rotation shaft of the turbine 102 into AC power;

(4) A converter 104 that converts AC power having undergone conversion by the power generator 103 into DC power;

(5) An inverter 105 that converts DC power having undergone conversion by the converter 104 into AC power;

(6) A pitch angle controller 106 that controls the pitch angle of the blades 101;

(7) A DC/AC conversion controller 107 that controls the power conversion by the converter 104 and the inverter 105;

(8) A power-generation-device data detector 108 that detects effective power outputs Pw1 to Pwn, reactive power outputs Qw1 to Qwn, and pitch angle βw1 to βwn, and angular speed deviation Δω1 to Δωn in the wind power generation device 100; and (9) A booster transformer 109 provided at a connection point between the wind power generation device 100 and the power line 4.

The blades 101 includes vanes receiving wind energy, and a hub provided at the center of the vanes. The vanes are formed in a so-called tapered shape in order to convert wind kinetic energy into mechanical energy. The base portions of the vanes are attached to the hub. The hub includes a mechanism that can change the pitch angle βw1 to βwn which is the attaching angle of the vanes.

The hub is connected with the rotation shaft of the turbine 102, and rotates the rotation shaft by mechanical energy converted through the vanes. The turbine 102 transmits rotation energy of the rotation shaft to the power generator 103.

The power generator 103 generates AC currents based on the transmitted rotation energy. The generated AC currents are output to the converter 104. The converter 104 converts the input AC currents into DC power. The DC power is output to the inverter 105. The inverter 105 converts the input DC currents into AC currents with the same frequency as that of the commercial system.

Each wind power generation device 100(1 to n) is provided with the power-generation-device data detector 108 that detects the effective power output Pw1 to Pwn, the reactive power output Qw1 to Qwn, the pitch angle βw1 to βwn, and the angular speed deviation Δω1 to Δωn in the local wind power generation device 100. The power-generation-device data detector 108 is coupled with the pitch angle controller 106 that controls the pitch angle of the blades 101 as well as the power generator, and the AC/DC converter controller 107 that controls the power conversion by the converter 104 as well as the inverter 105. The power-generation-device data detector 108 detects the pitch angle βw1 to βwn as well as the angular speed deviation Δω1 to Δωn from the pitch angle controller 106, and the effective power output Pw1 to Pwn as well as the reactive power output Qw1 to Qwn from the AC/DC converter controller 107.

The booster transformer 109 is provided at the output side of the inverter 105. The booster transformer 109 is provided at a connection point between the wind power generation device 100 and the power line 4, and boosts the voltage of the wind power generation device 100(1 to n) to a voltage at the power-line-4 side. The power lines 4 in the wind farm are collected. A similar transformer is provided at a connection point between the collected power lines 4 and the system 3. A circuit breaker is provided at each connection point, and by a switching operation of the circuit breaker, the wind power generation devices 100(1 to n) are capable of being electrically connected or disconnected to the power lines 4, and the power lines 4 are also be capable of being electrically connected or disconnected to the system 3.

The supplied power data detecting unit 5 that detects various electric quantities is provided at the connection point between the power lines 4 and the system 3. The supplied power data detecting unit 5 detects an effective power Pwf, a reactive power Qwf, a voltage Vwf, and a frequency f at the connection point. The supplied power data detecting unit 5 is coupled with the output control device 1, and transmits the detected effective power Pwf, reactive power Qwf, voltage Vwf, and frequency f to the output control device 1 of the wind farm.

2. Structure of Output Control Device 1

The output control device 1 employs the following structures:

(1) A potential estimator 11 that calculates the maximum power (hereinafter, referred to as potential) of the whole wind firm;

(2) A control amount determiner 12 that determines, based on the maximum amount of electrical power of the wind farm that is potential Pwf_po estimated by the potential estimator 11, a control amount Pwf_r of effective power in the wind farm and a control amount Qwf_r of reactive power in the wind farm;

(3) A control amount distributer 13 that distributes the control amount Pwf_r of the effective power and the control amount Qwf_r of the reactive power both determined by the control amount determiner 12 based on the available power generation amount of each wind power generation device 100;

(4) An interface from an inputter 14 for allowing a user to input an effective power target value Pwf_ref and a reactive power target value Qwf_ref to the control amount determiner 12; and (5) An interface from a system operation unit 15 for setting the effective power target value Pwf_ref and the reactive power target value Qwf_ref to the control amount determiner 12.

(Potential Estimator 11)

Figure 2:
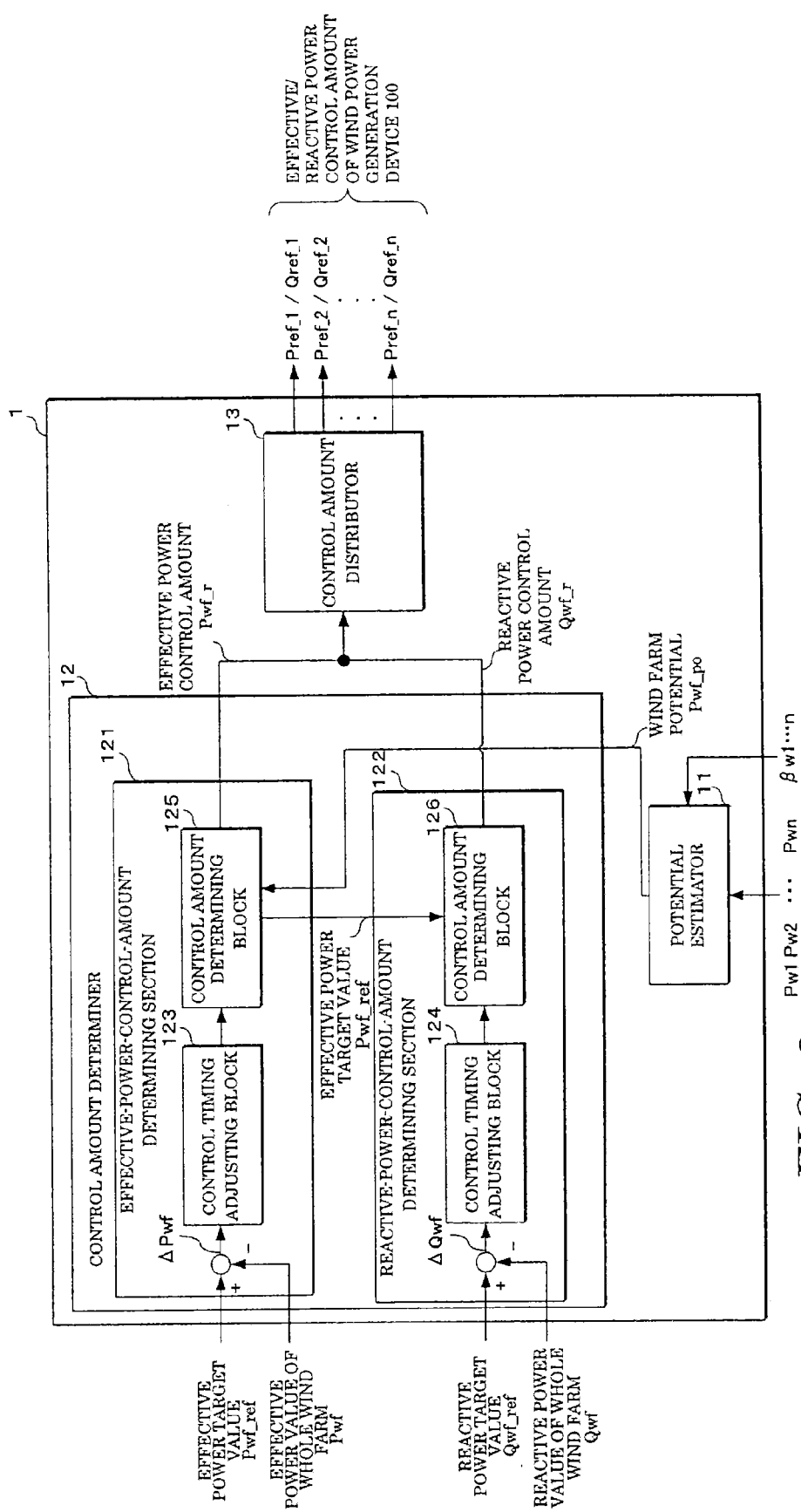
FIG. 2 is a block diagram illustrating a structure of the output control device according to the first embodiment.

As illustrated in FIG. 2, the potential estimator 11 estimates maximum outputtable power (hereinafter, referred to as potential) Pwf_po by the wind farm based on the effective power output Pw1 to Pwn, and pitch angle βw1 to βwn of the wind power generation devices 100(1 to n).

Figure 3:
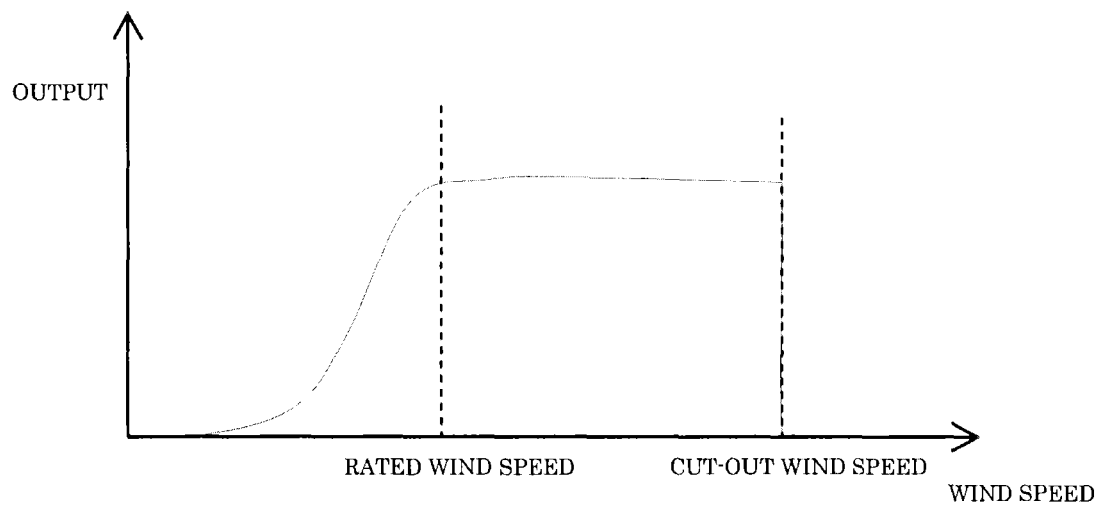
FIG. 3 is a graph illustrating a relationship between a wind speed and an output in a wind power generation device.

The potential estimator 11 is connected to the detector 108 of each wind power generation device 100, and has input thereto the effective power output Pw1 to Pwn and pitch angle βw1 to βwn of each wind power generation device 100(1 to n). Potential Pw1* to Pwn* can be estimated as a characteristic function of a wind speed and an output. As illustrated in FIG. 3, the output by the wind power generation device 100 increases at a cubic rate to a wind speed when the wind speed is less than a rated wind speed. When the wind speed becomes equal to or faster than the rated wind speed, the pitch angle βw1 to βwn is controlled to ease the excessive wind, thereby performing a constant output operation. Still further, when the wind speed becomes equal to or faster than a cut-out wind speed, a safety suspension is performed in order to cope with too strong wind.

The potential estimator 11 calculates the total of the estimated potentials Pw1* to Pwn* of the respective wind power generation devices 100(1 to n), thereby estimating the potential Pwf_po of the whole wind farm.

(Control Amount Determiner 12)

The control amount determiner 12 determines the control amount of an wind-farm output so as not to exceed the potential Pwf_po of the whole wind farm that is the total of the outputtable potentials Pw1* to Pwn* by the respective wind power generation devices 100(1 to n). The control amount of the wind-farm output is calculated as the control amount Pwf_r of the effective power and the control amount Qwf_r of the reactive power.

The control amount determiner 12 is connected to the detectors 108(1 to n), the supplied power data detecting unit 5, and the potential estimator 11. Input to the control amount determiner 12 are, from the detector 108, the effective power outputs Pw1 to Pwn, the reactive power outputs Qw1 to Qwn, the pitch angles βw1 to βwn, the angular speed deviations Δω1 to Δωn of the respective wind power generation devices 100(1 to n), and from the supplied power data detecting unit 5, the effective power Pwf, the reactive power Qwf, the voltage Vwf, and the frequency f all at the connection point, and, from the potential estimator 11, the potential Pwf_po.

The control amount determiner 12 includes an effective-power-control-amount determining section 121 that determines the control amount Pwf_r of effective power, and a reactive-power-control-amount determining section 122 that determines the control amount Qwf_r of reactive power. The effective-power-control-amount determining section 121 and the reactive-power-control-amount determining section 122 includes control timing adjusting blocks 123, 124 adjusting a control timing, and control amount determining blocks 125, 126 determining the control amount, respectively.

The effective-power-control-amount determining section 121 determines the control amount Pwf_r of effective power in the wind farm based on the effective power target value Pwf_ref of the wind farm, the effective power Pwf of the wind farm, and the potential Pwf_po of the wind farm. The effective power target value Pwf_ref is not limited to a preset value, and may be calculated based on various conditions. In addition, such a target value may be input from the inputter 14 or the system operation unit 15 connected to the control amount determiner 12. The effective power Pwf of the wind farm is a value detected by the supplied power data detecting unit 5.

The effective-power-control-amount determining section 121 includes the control timing adjusting block 123 and the control amount determining block 125.

The control timing adjusting block 123 adjusts the control timing of the control amount Pwf_r of effective power. The control timing adjusting block 123 performs, on a deviation ΔPwf1 that is a difference between the effective power target value Pwf_ref of the wind farm and the effective power Pwf thereof, a gain compensation, a delay phase compensation, a primary delay process, and an hunting suppression process, thereby obtaining a deviation ΔPwf2 having undergone delay component compensation.

Figure 4:
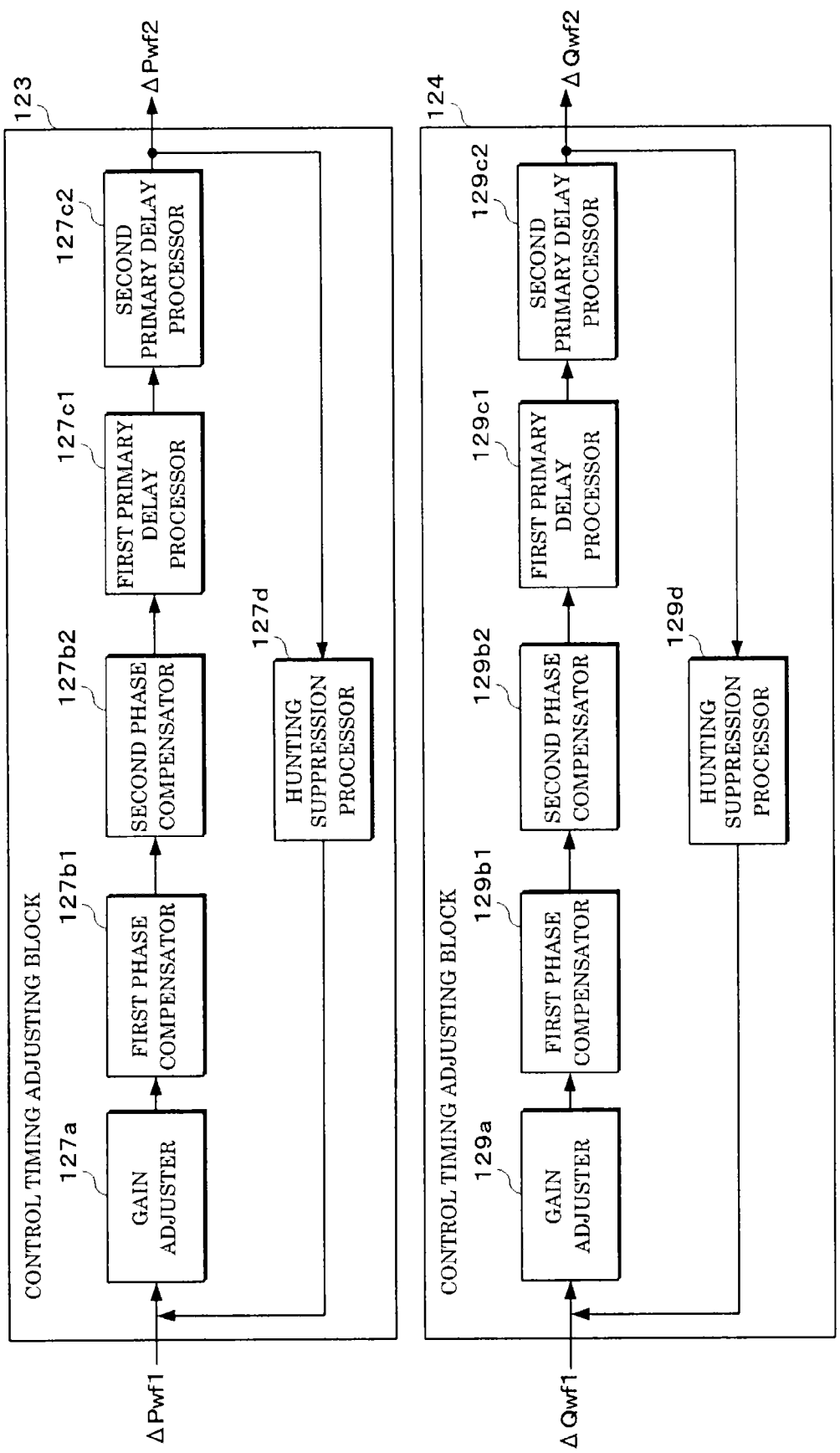
FIG. 4 is a block diagram illustrating a structure of a control timing adjusting block according to the first embodiment.

The control timing adjusting block 123 includes the following structures as illustrated in FIG. 4 to compensate the delay components in the deviation ΔPwf1 and to adjust the control timing:

(1) A gain adjuster 127a compensating a gain;
(2) A first delay phase compensator 127b1 compensating a delay phase;
(3) A second delay phase compensator 127b2 compensating a delay phase;
(4) A first primary delay processor 127c1 performing a primary delay process;
(5) A second primary delay processor 127c2 performing a primary delay process; and
(6) An hunting suppression processor 127d.

The control timing adjusting block 123 has the gain adjuster 127a, the first delay phase compensator 127b1, the second delay phase compensator 127b2, the first primary delay processor 127c1, and the second primary delay processor 127c2 connected in series.

The gain adjuster 127a increases or decreases the gain of the input control amount determined by each control unit, thereby increasing the stability and improving the steady characteristic. When the delay components in the deviation ΔPwf1 are compensated, the compensation is performed with a compensation gain K1p.

The first delay phase compensator 127b1 compensates the phase of the control amount having undergone the gain compensation by the gain adjuster 127a. As to the phase delay compensation relative to the deviation ΔPwf1, the compensation is performed through a transfer function Gp1(s) expressed by the following formula (1). Note that T1p and T2p are time constants of a first delay phase.

[Formula 1]

$$Gp1(s) = \frac{1 + T1ps}{1 + T2ps} \qquad (1)$$

The second delay phase compensator 127b2 further performs a phase compensation on the deviation ΔPwf1 having undergone the delay phase compensation by the first delay phase compensator 127b1. As to the compensation on the phase delay relative to the deviation ΔPwf1, the compensation is performed through a transfer function Gp2(s) expressed by the following formula (2). Note that T3p and T4p are time constants of a second delay phase.

[Formula 2]

$$Gp2(s) = \frac{1 + T3ps}{1 + T4ps} \qquad (2)$$

The first primary delay processor 127c1 processes, on the deviation ΔPwf1 having undergone the delay phase compensation by the second delay phase compensator, a primary delay in the deviation ΔPwf1. As to the primary delay process to the deviation ΔPwf1, the compensation is performed through a transfer function Gp3(s) expressed by the following formula (3). Note that T5p is a time constant of the first primary delay component.

[Formula 3]

$$Gp3(s) = \frac{1}{1 + T5ps} \qquad (3)$$

The second primary delay processor 127c2 further processes the primary delay in the deviation ΔPwf1 having undergone the primary delay process by the first primary delay processor 127c1. As to the primary delay process to the deviation ΔPwf1, the compensation is performed through a transfer function Gp4(s) expressed by the following formula (4). Note that T6p is a time constant of the second primary delay component.

[Formula 4]

$$Gp4(s) = \frac{1}{1 + T6ps} \qquad (4)$$

The multiple wind power generation devices 100 are connected between systems, and the output by a wind power generation device 100 affects the output by the output device of the other wind power generation device 100. When the control amount is calculated based on affected data, an adverse effect of vibration due to a mutual effect between the systems appears in the control amount and the control timing that are the calculation results. The hunting suppression processor suppresses elements affected by vibration and contained in the deviation ΔPwf1 having undergone the second primary delay process. The suppression of the affected elements by vibration contained in the deviation ΔPwf1 is performed through a transfer function Gp5(s) expressed by the following formula (5). Note that K2p is a gain of hunting suppression, while T7p is a time constant thereof.

[Formula 5]

$$Gp5(s) = \frac{K2p \cdot T7ps}{1 + T7ps} \qquad (5)$$

The control amount determining block 125 calculates the effective power control amount Pwf_r that tracks the effective power target value Pwf_ref of the wind farm output based on ΔPwf2 having undergone the compensation of the delay components. The effective power control amount Pwf_r tracking the effective power target value Pwf_ref can be obtained through a PI control based on a proportional gain KPp1 and an integration gain Klp1. Hence, when the effective power Pwf of the wind farm output becomes close to the target value Pwf_ref, the control amount Pwf_r can be reduced, and thus a change in the control amount Pwf_r can be reduced. In addition, a steady deviation can be eliminated, and thus the effective power Pwf can be made close to the target value Pwf_ref.

The control amount determining block 125 includes a limiter that sets the effective power control amount Pwf_r to be within the minimum or maximum range of the effective power output by the wind farm. As to the reactive power output maximum, a potential Pwf_po obtained by the potential estimator 11 is set. Hence, the effective power control amount Pwf_r becomes a smaller value than the potential Pwf_po.

The reactive-power-control-amount determining section 122 includes the timing adjusting block 124 and the control amount determining block 126.

The timing adjusting block 124 adjusts the timing of the control amount Qwf_r of reactive power. Input into the timing adjusting block 124 is ΔQwf1 that is a difference between the reactive power target value Qwf_ref of the wind farm and reactive power Qwf thereof. The timing adjusting block 124 performs a gain adjustment, a delay phase compensation, a primary delay process, and an hunting suppression process on ΔQwf1, thereby obtaining ΔQwf2 having undergone the delay component compensation.

The timing adjusting block 124 illustrated in FIG. 4 employs the same structure as that of the timing adjusting block 123. The differences from the timing adjusting block 123 are gains and time constants in a gain adjuster 129a, a first delay phase compensator 129b1, a second delay phase compensator 129b2, a first primary delay processor 129c1, a second primary delay processor 129c2, and an hunting suppression processor 129d.

A gain of the gain adjuster 129a is K1q. In addition, a transfer function of the first delay phase compensator 129b1 can be expressed by the following formula (6), while a transfer function of the second delay phase compensator 129b2 can be expressed by the following formula (7). Note that T1q and T2q are time constants of a first delay phase, while T3q and T4q are time constants of a second delay phase.

[Formula 6]
$$Gp6(s) = \frac{1+T1qs}{1+T2qs} \quad (6)$$

[Formula 7]
$$Gp7(s) = \frac{1+T3qs}{1+T4qs} \quad (7)$$

The respective transfer functions of the first primary delay processor 129c1, the second primary delay processor 129c2, and the hunting suppression processor 129d can be expressed by the following formulae (8), (9), and (10). Note that T5q is a time constant of a first primary delay, T6q is a time constant of a second primary delay, K2q is a gain of hunting suppression, and T7q is a time constant of hunting suppression.

[Formula 8]
$$Gp8(s) = \frac{1}{1+T5qs} \quad (8)$$

[Formula 9]
$$Gp9(s) = \frac{1}{1+T6qs} \quad (9)$$

[Formula 10]
$$Gp10(s) = \frac{K2q \cdot T7qs}{1+T7qs} \quad (10)$$

The control amount determining block 126 determines the reactive power control amount Qwf_r that tracks the reactive power target value Qwf_ref of the wind farm output based on the deviation ΔQwf2 having undergone the delay component compensation. The reactive power control amount Qwf_r that tracks the reactive power target value Qwf_ref can be obtained through a PI control based on a proportional gain KPq1 and an integration gain Klq1 At this time, the control amount determining block 126 includes a limiter that sets the reactive power control amount Qwf_r to be within the preset minimum/maximum range ±Qwf_limit of the wind farm reactive power. The minimum/maximum value ±Qwf_limit of reactive power can be calculated through the following formula (11) based on the total value Swf_VA of the ratings of the wind power generation devices 100(1 to n) and the effective power target value Pwf_ref.

[Formula 11]
$$Qwf\_limit = \sqrt{(Swf\_VA^2 - Pwf\_ref^2)} \quad (11)$$

The effective power control amount Pwf_r calculated by the effective-power-control-amount determining section 121 and the reactive power control amount Qwf_r calculated by the reactive-power-control-amount determining section 122 both employing the above-explained structures are output to the control amount distributor 13.

(Control Amount Distributor 13)

The control amount distributor 13 distributes the effective power control amount Pwf_r and the reactive power control amount Qwf_r based on distribution gains different from each control amount. The distributed control amounts are transmitted to the respective wind power generation devices 100(1 to n).

Figure 5:
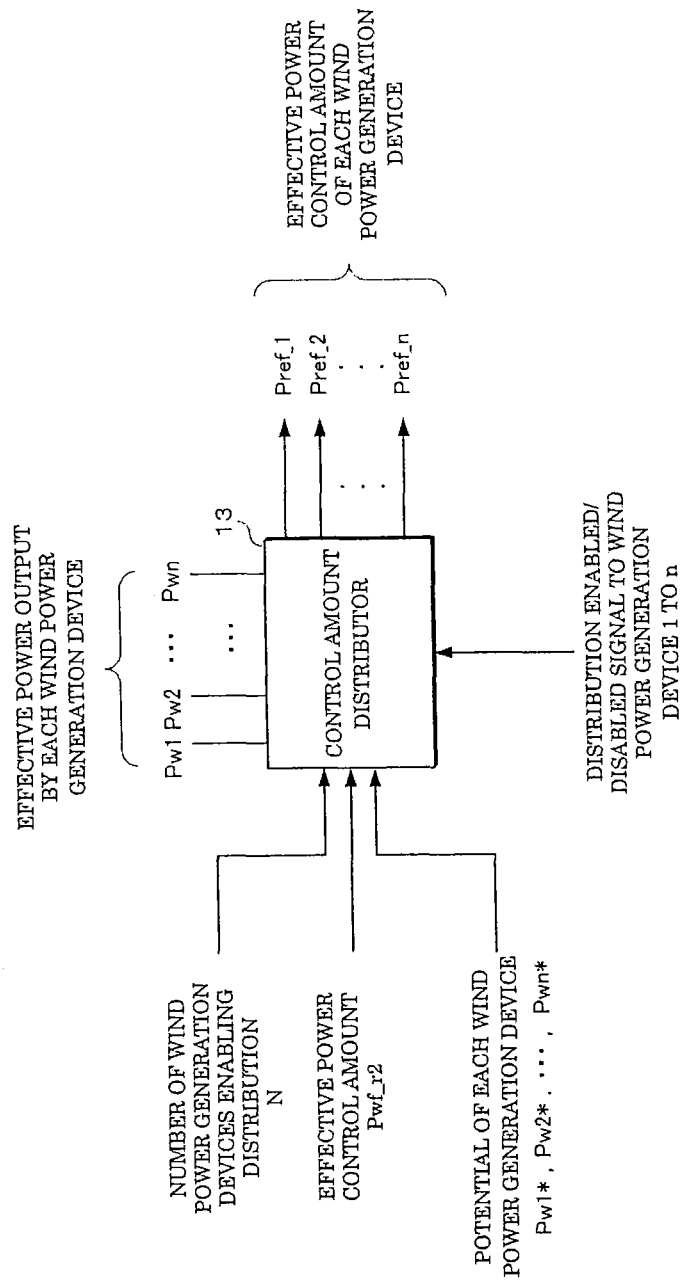
FIG. 5 is a block diagram illustrating a structure of a control amount distributor distributing a control amount of effective power according to the first embodiment.

The control amount distributor 13 distributes the effective power control amount Pwf_r only to, among the wind power generation devices 100(1 to n) in the wind farm, the wind power generation devices 100(1 to N) that enable a distribution of the control amount. N is a value obtained by subtracting the number of wind power generation devices 100 that do not enable a distribution of the control amount from the total number of the wind power generation devices 100 in the wind farm. As illustrated in FIG. 5, input to the control amount distributor 13 are the effective power control amount Pwf_r, the number N of wind power generation devices enabling a distribution, the potentials Pw1* to Pwn* of the respective wind power generation devices, effective power outputs Pw1 to Pwn of the respective wind power generation devices, and a distribution enabled signal or disabled signal to each wind power generation device 100(1 to n).

The control amount distributor 13 sets distribution gains Gdp1 to Gdpn to distribute the effective power control amount Pwf_r. The distribution gains Gdp1 to Gdpn are calculated in consideration of a difference between the potentials Pw1* to Pwn* of the respective wind power generation devices and the effective power outputs Pw1 to Pwn thereof. The distribution gains Gdp1 to Gdpn increase a distribution to the wind power generation device having a sufficient effective power output, while decrease a distribution to the wind power generation device having an insufficient effective power output. The total of the distribution gains Gdp1 to Gdpn becomes the number N of the wind power generation devices enabling a distribution. The control amount of the effective power of the wind power generation device that is not subjected to the distribution is set to be zero.

Figure 6:
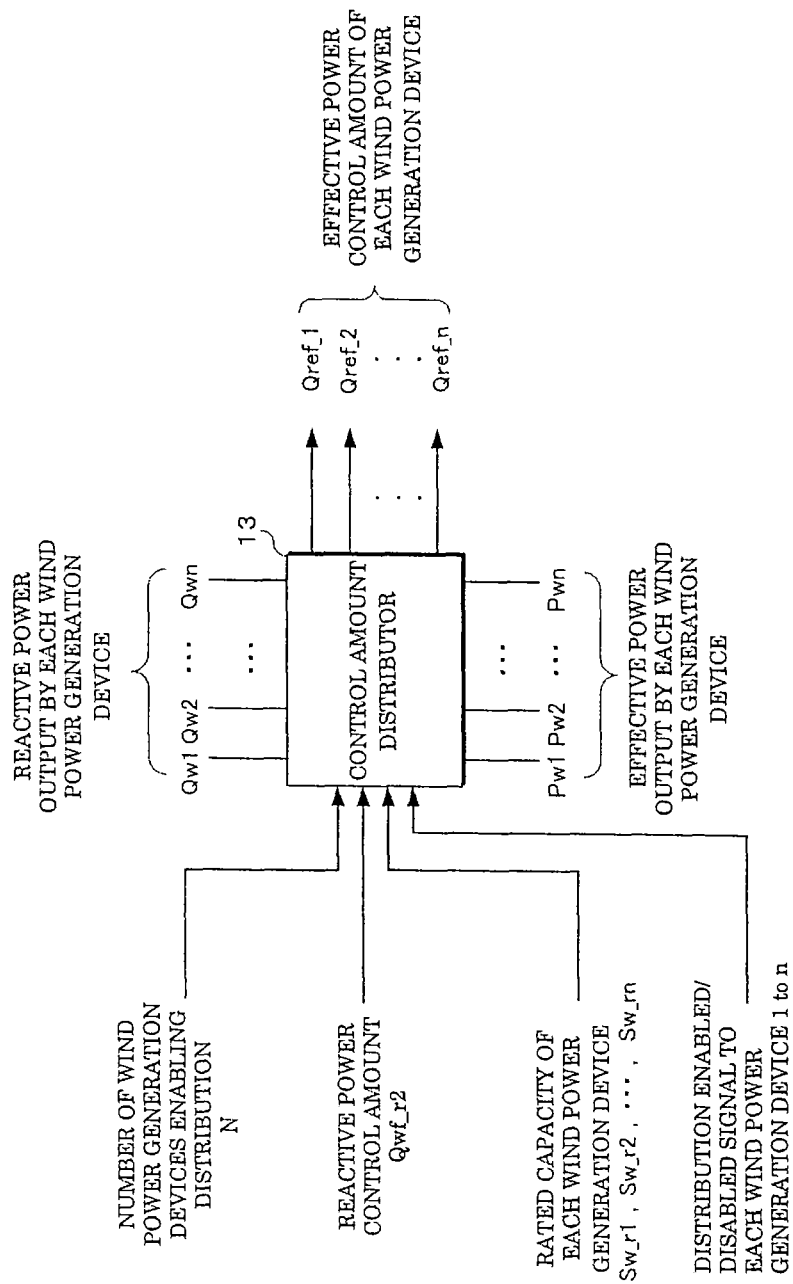
FIG. 6 is a block diagram illustrating a structure of the control distributor distributing a control amount of reactive power according to the first embodiment.

In addition, as illustrated in FIG. 6, input into the control amount distributor 13 are, to set distribution gains Gdq1 to Gdqn to distribute the reactive power control amount Qwf_r, the reactive power control amount Qwf_r, the number N of the wind power generation devices enabling a distribution, rated capacities Sw_r1 to Sw_rn of the respective wind power generation devices, the reactive power outputs Qw1 to Qwn of the respective wind power generation devices, the effective power outputs Pw1 to Pwn of the respective wind power generation devices, and a distribution enabled signal or disabled signal to each wind power generation device 100(1 to n).

The distribution gains Gdq1 to Gdqn are calculated in consideration of a difference between the rated capacities Swr1 to Swrn of the respective wind power generation devices and apparent powers Swr1 to Swrn thereof. The distribution gains Gdq1 to Gdqn increase a distribution to the wind power generation device having a sufficient reactive power output, and decrease a distribution to the wind power generation device having an insufficient reactive power output. The apparent powers Swr1 to Swrn of the respective wind power generation devices are calculated based on the effective power outputs Pw1 to Pwn of the respective wind power generation devices and the reactive power outputs Qw1 to Qwn thereof. The total of the distribution gains Gdq1 to Gdqn is controlled so as to be the number N of the wind power generation devices enabling a distribution. The reactive power control amount of the wind power generation device not subjected to the distribution is set to be zero.

[1-2. Operation]

The wind farm output control device of this embodiment employing the above-explained structure sets a control amount of the whole wind farm based on detection data detected at the output node of the wind farm and the control target value. Next, the control amount of each wind power generation device 100(1 to n) is calculated based on the control amount of the whole wind farm. When the control amount of the whole wind farm is calculated, the control timing is adjusted. In the following explanation, a calculation of the control amount of the whole wind farm, an adjustment of the control timing, and a distribution of the control amount will be explained separately.

(Calculation of Control Amount of Whole Wind Farm)

The wind farm output control device controls the outputs of the respective wind power generation devices 100(1 to n) based on the control amount of the whole wind farm.

(1) Calculation of Control Amount Pwf_r of Wind Farm Effective Power

Figure 7:
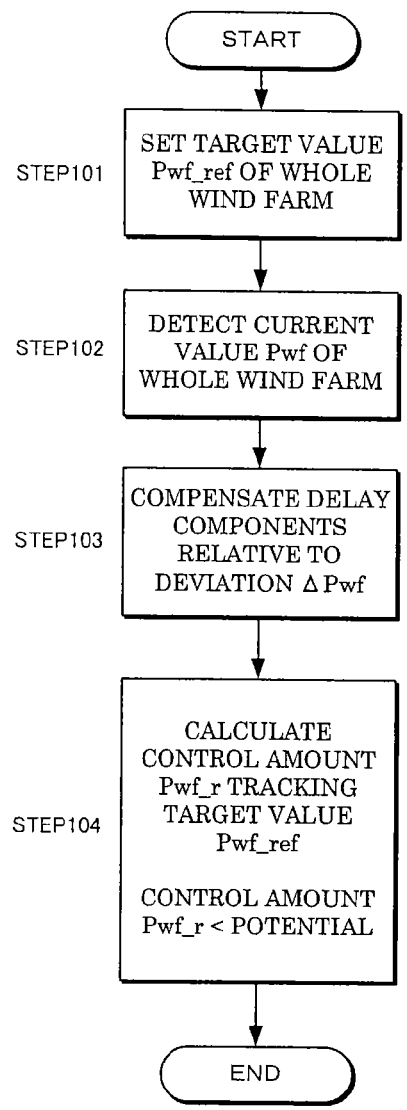
FIG. 7 is a flowchart illustrating a calculating process of a control amount of effective power according to the first embodiment.
Figure 8:
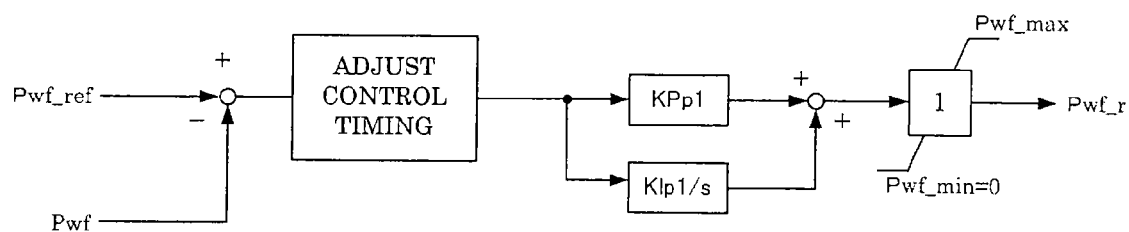
FIG. 8 is a schematic diagram illustrating an outline of an effective-power-control-amount calculation according to the first embodiment.

The control amount Pwf_r of the wind farm effective power is calculated based on the effective power target value Pwf_ref of the wind farm, the effective power Pwf of the wind farm, and the potential Pwf_po. FIG. 7 is a flowchart illustrating a calculating process of the effective power control amount Pwf_r, and FIG. 8 is a schematic diagram illustrating the effective-power-control-amount determining section 121 calculating the effective power control amount Pwf_r.

In the calculation of the effective power control amount Pwf of the whole wind farm, first, the effective power target value Pwf_ref is set. The effective power target value Pwf_ref is set based on a preset value, and a target value input through the inputter 14 and the system operation unit 15 (STEP 101).

Next, the effective power Pwf of the whole wind farm is detected. As to the effective power Pwf, the effective power Pwf at the connection point detected by the supplied power data detecting unit 5 is adopted (STEP 102).

Still further, a gain adjustment, a delay phase compensation, a primary delay process, and an hunting suppression process are performed on the deviation ΔPwf1 between the effective power Pwf of the wind farm and the effective power target value Pwf_ref, thereby compensating the delay components contained in the deviation ΔPwf1 (STEP 103).

The effective power control amount Pwf_r that tracks the effective power target value Pwf_ref of the wind farm output is calculated based on the deviation ΔPwf2 having undergone the delay component compensation. The effective power control amount Pwf_r that tracks the effective power target value Pwf_ref can be obtained through a PI control based on the proportional gain KPp1 and the integration gain KIp1. At this time, there is a limiter that sets the effective power control amount Pwf_r to be within the preset minimum range or maximum range of the effective power output of the wind farm. For the effective power output maximum, for example, the potential Pwf_po obtained by the potential estimator 11 is set (STEP 104).

As is indicated by the procedures in FIG. 7, the effective power control amount Pwf_r is calculated based on the wind farm effective power Pwf of the wind farm and the effective power target value Pwf_ref.

(2) Calculation of Reactive Power Control Amount Qwf_r of Wind Farm

Figure 9:
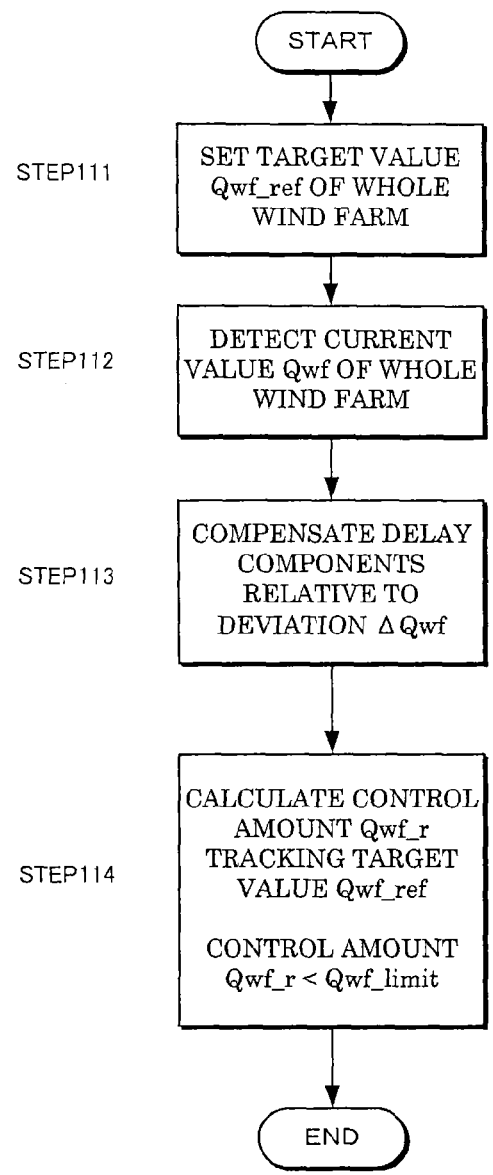
FIG. 9 is a flowchart illustrating a calculating process of a control amount of reactive power according to the first embodiment.
Figure 10:
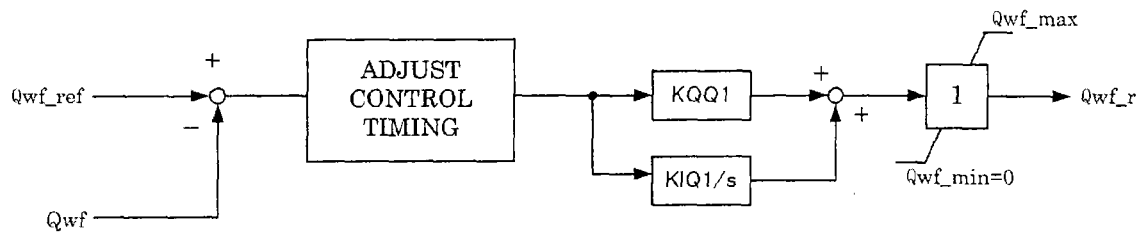
FIG. 10 is a schematic diagram illustrating an outline of a reactive-power-control-amount calculation according to the first embodiment.

The calculation of the control amount Qwf_r of reactive power of the wind farm is performed based on the reactive power target value Qwf_ref of the wind farm, the reactive power Qwf of the wind farm, and the minimum value or maximum value ±Qwf_limit of the reactive power. FIG. 9 is a flowchart in the reactive power control operation, and FIG. 10 is a schematic diagram of the reactive-power-control-amount determining section 122 determining the reactive power control amount Qwf_r.

In the calculation of the reactive power control amount Qwf_r of the whole wind farm, first, the reactive power target value Qwf_ref is set. The reactive power target value Qwf_ref is set based on a preset value and a target value input through the inputter 14 and the system operation unit 15 (STEP 111).

Next, the reactive power Qwf of the whole wind farm is detected. As to the reactive power Qwf, the reactive power Qwf at the connection point detected by the supplied power data detecting unit 5 is adopted (STEP 112).

Still further, a gain adjustment, a delay phase compensation, a primary delay process, and an hunting suppression process are performed on the deviation ΔQwf1 between the reactive power Qwf of the wind farm and the reactive power target value Qwf_ref, thereby compensating the delay components contained in the deviation ΔQwf1 (STEP 113).

The reactive power control amount Qwf_r that tracks the reactive power target value Qwf_ref of the wind farm output is calculated based on the deviation ΔQwf2 having undergone the delay component compensation. The reactive power control amount Qwf_r that tracks the reactive power target value Qwf_ref can be obtained through a PI control based on the proportional gain KPg1 and the integration gain KIg1. At this time, there is a limiter that sets the reactive power control amount Qwf_r to be within the preset minimum/maximum range of the reactive power output by the wind farm. The reactive power output minimum value or maximum value ±Qwf_limit is calculated based on the effective power target value Pwf_ref that does not exceed the potential Pwf_po (STEP 114).

As is indicated by the procedures in FIG. 9, the reactive power control amount Qwf_r is calculated based on the wind farm reactive power Qwf of the wind farm and the reactive power target value Qwf_ref.

(Control Timing Adjustment)

The control timing of the wind farm control amount is adjusted in accordance with the calculations of the effective power control amount and the reactive power control amount. The delay components contained in the deviation ΔPwf1 and the delay components contained in the deviation ΔQwf1 are compensated to adjust the control timings in the effective power control amount Pwf_r and the reactive power control amount Qwf_r.

Respective controllers in the control amount determiner 12 calculate the wind farm control amount so as not to exceed the total potential outputtable by the respective wind power generation devices 100(1 to n) fluctuating time by time and by wind. Data necessary for the calculation of the control amount by the control amount determiner 12 is transmitted from the supplied power data detecting unit 5 provided at the connection point to the control amount determiner 12. When those pieces of data are transmitted, a transmission delay occurs. In addition, a delay caused upon calculation of the control amount by the control amount determiner 12 is also contained.

The control timing adjusting blocks 123, 124 compensate a transmission delay contained in the calculation result of the control amount and delay components caused at the time of calculation, thereby adjusting the control timing. Hence, a control based on the control amount is performed at a timing expected at the time of calculation.

Figure 11:
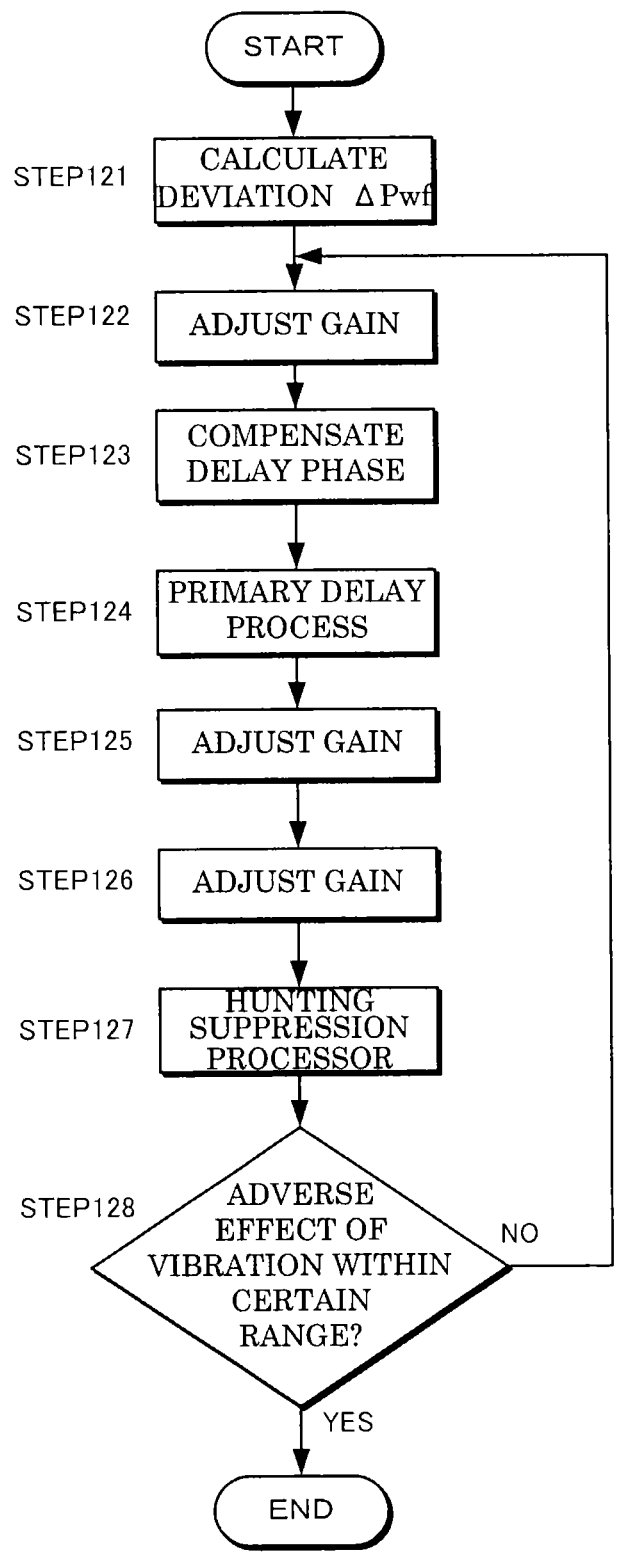
FIG. 11 is a flowchart illustrating a process of adjusting a control timing according to the first embodiment.

FIG. 11 is a flowchart illustrating a process of adjusting the control timing when the effective power control amount is calculated. As to the compensation of the delay components, first, the deviation ΔPwf between the effective power Pwf of the wind farm and the effective power target value Pwf_ref is calculated (STEP 121). Next, the gain of the calculated deviation ΔPwf is adjusted (STEP 122).

The delay phase of the deviation ΔPwf1 having undergone the gain adjustment is now compensated. As to the delay phase compensation, when two possible factors causing the phase delay are expectable, the compensation is performed through a transfer function having a time constant that can compensate the phase delay originating from each factor (STEPS 123).

Next, a primary delay process is performed on the deviation ΔPwf1 having undergone the phase compensation (STEPS 129). As to the primary delay process, when two possible primary delay factors are expectable, the compensation is performed through a transfer function having a time constant corresponding to each primary delay factor (STEPS 125, 126). Next, a vibration due to a mutual effect between the systems in the deviation ΔPwf having undergone the primary delay process is checked (STEP 127). Subsequently, it is determined whether or not the adverse effect of the vibration in the deviation ΔPwf having undergone the hunting suppression is within a certain range (STEP 127). When the adverse effect is within the certain range, the compensation of the delay components in the deviation ΔPwf1 is terminated. Conversely, when the adverse effect is out of the certain range, respective transfer functions of a gain adjustment, a delay phase compensation, a primary delay process, and an hunting suppression process are adjusted, and the delay components in the deviation ΔPwf1 are compensated again.

As is indicated by the procedures in FIG. 11, the delay components in the deviation ΔPwf1 between the effective power Pwf of the wind farm and the effective power target value Pwf_ref are eliminated, thereby adjusting the control timing of the control amount Pwf_r.

The explanation was given of an adjustment of the control timing of the effective power control amount Pwf_r, but an adjustment of the control timing of the reactive power control amount Qwf_r can be also carried out through the similar procedures using the gains and the transfer functions that compensate the delay components in the deviation ΔQwf1.

(Distribution of Control Amount)

The output control device for the wind farm of this embodiment distributes the power control amounts Pwf_r and Qwf_r both having undergone the control timing adjustment to the respective wind power generation devices 100(1 to n), thereby determining control amounts Pref_1 to Pref_n, and Qref_1 to Qref_n in the respective wind power generation devices 100(1 to n). As to the distribution of the control amount, respective different distribution gains for the respective power control amounts Pwf_r and Qwf_r are calculated, and the distribution of the control amount is set based on such distribution gains.

(1) Distribution of Effective Power Control Amount Pwf_r of Wind Farm

Figure 12:
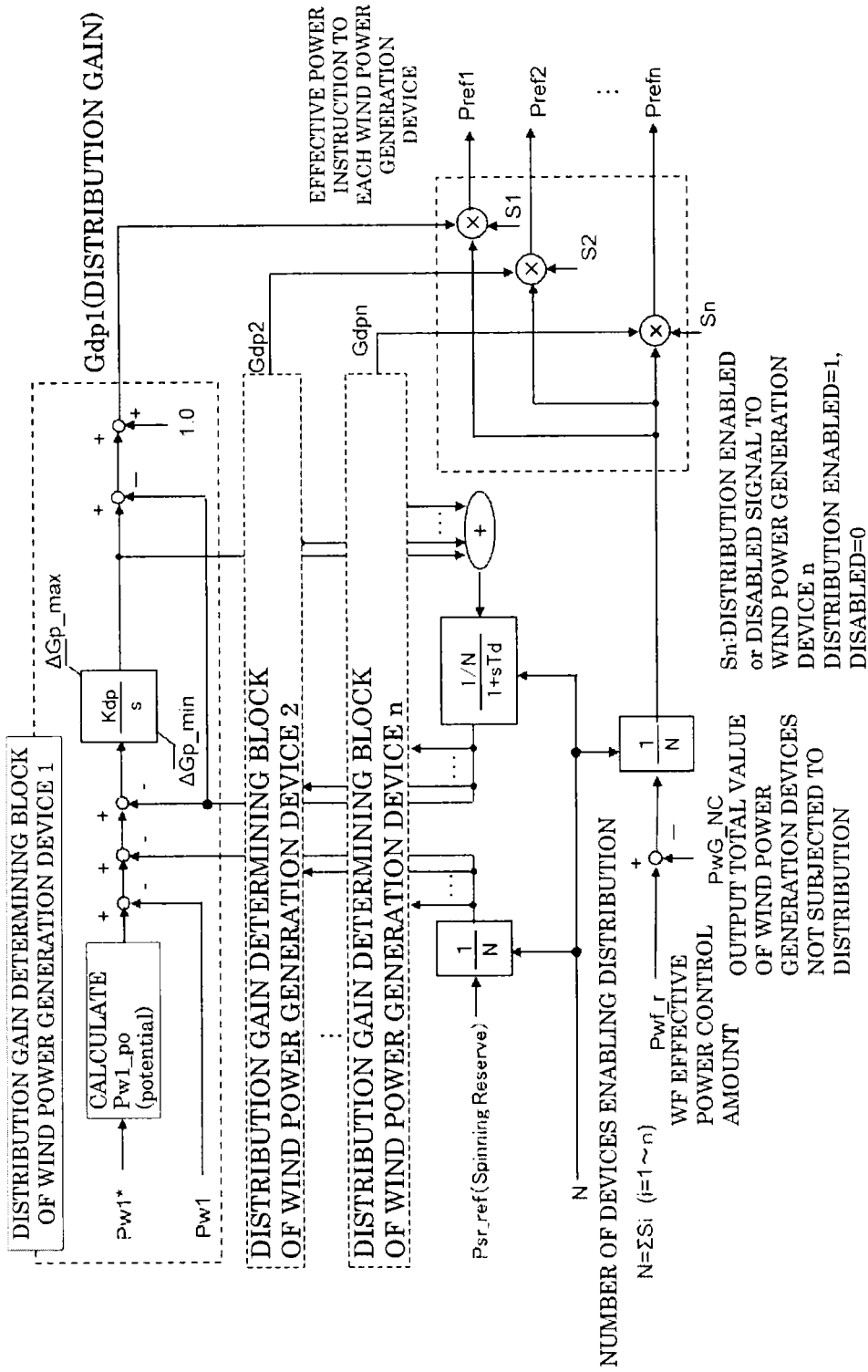
FIG. 12 is a schematic diagram illustrating an outline of an effective-power-control-amount distribution according to the first embodiment.

An explanation will be given of an operation of the control amount distributor 13 of this embodiment with reference to FIG. 12. The control amount distributor 13 sets distribution gains Gdp1 to Gdpn to distribute the effective power control amount pwf_r determined by the control amount determiner 12 to the respective wind power generation devices 100(1 to n). The distribution gains Gdp1 to Gdpn are set based on the available power generation amount of the respective wind power generation devices 100(1 to n). The control amount distributor 13 adjusts the control amount Pref_1 to Pref_n for the respective wind power generation devices 100(1 to n) based on the set distribution gains Gdp1 to Gdpn, and outputs the control amounts Pref_1 to Pref_n to the respective wind power generation devices 100 through the control line 2. Each wind power generation device 100 generates power based on the control amount Pref_1 to Pref_n.

The procedures of the distribution by the control amount distributor 13 are as follow.

A difference between the potential Pw1* to Pwn* of each wind power generation device 100 obtained by the estimation based on the detected values (Pinv1, . . . Pinvn, β1, . . . βn, Δω1, . . . Δωn) by the power-generation-device data detector 108 in each wind power generation device 100(1 to n) and the effective power value (Pw1, Pwn) of each wind power generation device 100(1 to n) is obtained. When a spinning reserve is further taken into consideration, the spinning reserve is further subtracted.

The control amount distributor 13 transmits, to the wind power generation device 100(1 to n) having a large difference among the wind power generation devices 100, an instruction to increase the effective power output. This output is based on a preset acceleration gain Kdp. A control is performed in such a way that the total (Gdp1+Gdp2+. . . +Gdpn) of the distribution gains becomes n. n is the number of wind power generation devices. Tdp is a control cycle, ΔGdp_min and ΔGdp_max are upper and lower limits of the distribution gain. In this case, Kdp is a coefficient that adjusts the magnitude of distribution. The maximum distribution gain ΔGdp_max and the minimum distribution gain ΔGdp_min are set in such a way that a distribution gain given to each wind power generation device 100 does not become equal to or larger than a certain level or smaller than a certain level.

More specifically, the following process is performed.

(1) The output effective power value (Pw1, . . . Pwn) of each wind power generation device 100 is subtracted from the potential Pw1* to Pwn* thereof, and a spinning reserve is further subtracted therefrom, thereby obtaining an available power generation output of each wind power generation device 100.

(2) A result obtained by totaling, for each control cycle, respective integrals of the available power generation amounts of the wind power generation devices 100, and divided by the number n of the wind power generation devices 100 in the wind farm is subtracted from the available power generation amount of each wind power generation device 100, thereby setting a gain for causing the wind power generation device 100 with a large available power generation amount to bear a large control amount.

(3) This result is added to (1) to set the distribution gain Gdp1 to Gdpn. At this time, the total of the distribution gains Gdp1 to Gdpn becomes the total number n of the wind power generation devices 100.

(4) With restrictions of $\Delta$Gdp_max and $\Delta$Gdp_min, in order to set the distribution gains to be n, the result of the step (2) is subtracted before the step (3) of adding (1).

The control amount distributor 13 sets the control amounts Pref_1 to Pref_n of the respective wind power generation devices 100(1 to n) based on the set distribution gains Gdp1 to Gdpn and the control amount Pwf_r set by the control amount determiner 12. Each wind power generation device 100 controls the own output through the pitch angle controller 106 and the DC/AC conversion controller 107 based on the distributed control amount Pref_1 to Pref_n. The pitch angle controller 106 changes the pitch angle of the blades 101 of the wind power generation device 100 to ease wind energy, thereby changing the effective power output. The DC/AC conversion controller 107 once converts the output by the power generation device into AC through the converter 104, and controls the effective power output and the reactive power output through the inverter 105.

(2) Distribution of Reactive Power Control Amount Qwf_r of Wind Farm

Figure 13:
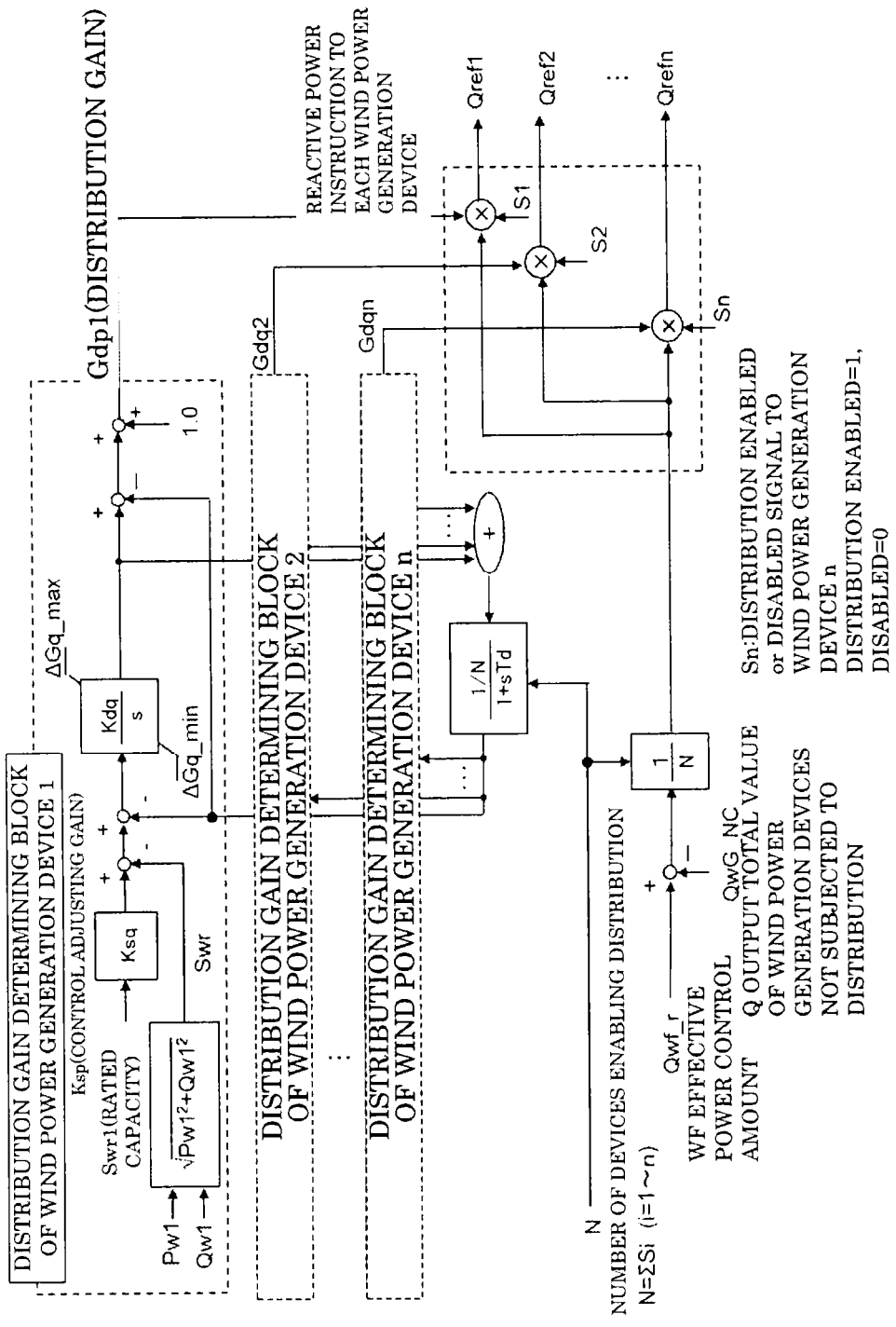
FIG. 13 is a schematic diagram illustrating an outline of a reactive-power control-amount distribution according to the first embodiment.

An explanation will be given of an operation of the control amount distributor 13 of this embodiment with reference to FIG. 13. The control amount distributor 13 sets distribution gains Gdq1 to Gdqn to distribute the reactive power control amount Qwf_r set by the control amount determiner 12 to the respective wind power generation devices 100(1 to n). The distribution gains Gdq1 to Gdqn are set based on the available power generation amounts of the respective wind power generation devices 100(1 to n). The control amount distributor 13 adjusts the control amount Qref_1 to Qref_n for the respective wind power generation devices 100(1 to n) based on the set distribution gains Gdq1 to Gdqn, and outputs the control amounts Qref_1 to Qref_n to the respective wind power generation devices 100 through the control line 2. Each wind power generation device 100 generates power based on the control amount Qref_1 to Qref_n.

The procedures of the distribution by the control amount distributor 13 are as follow.

An outputtable reactive power is obtained based on the effective power detected value (Pw1, . . . Pwn) of each wind power generation device 100(1 to n) and the reactive power detected value (Qw1, . . . Qwn). The reactive power output instruction transmitted to the wind power generation device 100 having a large difference between the outputtable reactive power and the rated capacity (Swr1 to Swrn) of the wind power generation device 100 is increased by a preset acceleration gain Kdq. The control is performed in such a way that the total of the distribution gains (Gdq1+Gdq2+ . . . +Gdqn) becomes n. Tdq is a control cycle, $\Delta$Gdq_min and $\Delta$Gdq_max are upper and lower limits of the distribution gain. In this case, Kdq is a coefficient that adjusts the magnitude of distribution like Kdp. $\Delta$Gdp_max is the maximum value of the distribution gain, and $\Delta$Gdp_min is the minimum value of the distribution gain. The distribution gains Gdq1 to Gdn to be given to the respective wind power generation devices 100(1 to n) are set in such a way that the respective distribution gains are located between $\Delta$Gdp_max and $\Delta$Gdp_min More specifically, (1) An outputtable reactive power is obtained based on the effective power detected value (Pw1, . . . Pwn) of the wind power generation device 100(1 to n) and the reactive power detected value (Qw1, . . . Qwn), and the rated capacity (Swr1 to Swrn) of the wind power generation device 100 is subtracted therefrom.

(2) A result obtained by totaling, for each control cycle, respective integrals of the reactive powers of the wind power generation devices 100, and divided by the number n of the wind power generation devices 100 is subtracted from the reactive power of each wind power generation device 100, thereby setting a gain for causing the wind power generation device 100 with a small reactive power to bear the reactive power control amount.

(3) This result is added to (1) to set the distribution gain Gdq1 to Gdqn. At this time, the total of the distribution gains (Gdq1+Gdq2+ . . . +Gdqn) becomes the total number n of the wind power generation devices 100.

(4) With restrictions of $\Delta$Gdq_max and $\Delta$Gdq_min, in order to set the distribution gains to be n, the result of the step (2) is subtracted before the step (3) of adding (1).

According to the above-explained operations, it becomes possible for the output control device to efficiently cause the wind farm reactive power output to track the target value within an outputtable range of each wind power generation device 100 in accordance with a present wind condition.

[1-3. Advantageous Effects]

According to this embodiment employing the above-explained structure and operations, the following advantageous effects can be accomplished.

(1) A data transfer delay contained in the calculation results of the effective power and reactive power control amounts and the delay components inherent to the calculation can be compensated, thereby adjusting the control timing. When a control is performed based on the control amount having the delay components not taken into consideration, the control timing is shifted by what corresponds to the delay caused by a transfer and at the time of calculation. In this case, when a control amount at a time T1 is set to be a control amount A1, and a control is performed at the time T1 based on the control amount A1, in practice, the control cannot be performed at the time T1, and the control based on the control amount A1 is performed at a time T2 that is late by the aforementioned delay.

Hence, when the wind condition differs between the time T1 and the time T2, even if the control is performed based on the control amount A1, the control is inappropriate, and the control becomes excessive or insufficient. In particular, when the control amount is insufficient, the output value after the control does not become constant, which may cause a hunting or an overshooting that exceeds a permitted value.

Conversely, according to this embodiment, the delay caused by a transfer and contained in the control amount calculation result and the delay caused by a calculation are compensated to adjust the control timing. Hence, it becomes possible to carry out a control based on the calculated control timing at a timing expected through a calculation.

(2) According to this embodiment, the control based on the calculated control amount can be performed at a timing expected through the calculation, and as to the output by the wind farm, the control amount is distributed within an outputtable range of each wind power generation device 100 in accordance with a present wind condition so as not to cause the output by the wind farm exceeding the outputtable power range of each wind power generation device 100. Hence, an efficient operation throughout the whole wind farm is enabled.

(3) Since the effective power output by the wind farm is caused to track the target value, a fluctuation due to wind can be suppressed, an operation becomes schedulable, and the system frequency becomes adjustable in accordance with an instruction from the system operation unit.

(4) According to this embodiment, a gain adjustment, a delay phase compensation, a primary delay process, and an hunting suppression process are performed on the deviations ΔPwf1 and ΔQwf1 by the control timing adjusting blocks 123, 124 to compensate the delay components. However, the delay components can be compensated through either one of the aforementioned processes only. In addition, the number of gain adjustments, delay phase compensations, primary delay processes, and hunting suppression processes to be performed can be set freely. That is, when there are multiple factors causing the phase delay, the number of the delay phase compensations to be performed can be set in accordance with the number of factors. This enables a delay component compensation in accordance with a factor causing that phase delay.

(5) The control timing adjusting blocks 123, 124 perform delay component compensation on the deviations ΔPwf1 and ΔQwf1. However, the control timing adjusting block 123 does not perform delay component compensation on the deviations ΔPwf1, but the delay component compensation may be performed for each of the wind farm effective power Pwf and the wind farm reactive power Pwf_ref. This facilitates a qualification of the factor causing the delay, and thus transfer functions in the gain adjustment, the delay phase compensation and the primary delay process can be set further easily.

(6) This embodiment can be realized by controlling, using a program, a computer that controls the output control device 1. The realizations of hardware resources and software resources in this case are optional. For example, the output control device 1 may include a memory to store the program, and an application program may be installed in the memory. The calculation of the effective power control amount Pwf_r and that of the reactive power control amount Qwf_r, and the compensation of the delay components contained in the respective control amounts can be performed using this application program. The application program includes necessary settings, formulae, and parameters, etc., for such processes, and those are stored in the memory beforehand. An example memory is a built-in or removable memory. In addition, this embodiment can be understood as the program and a computer-readable memory medium having stored therein the program.

[2. Second Embodiment]

[2-1. Structure]

Figure 14:
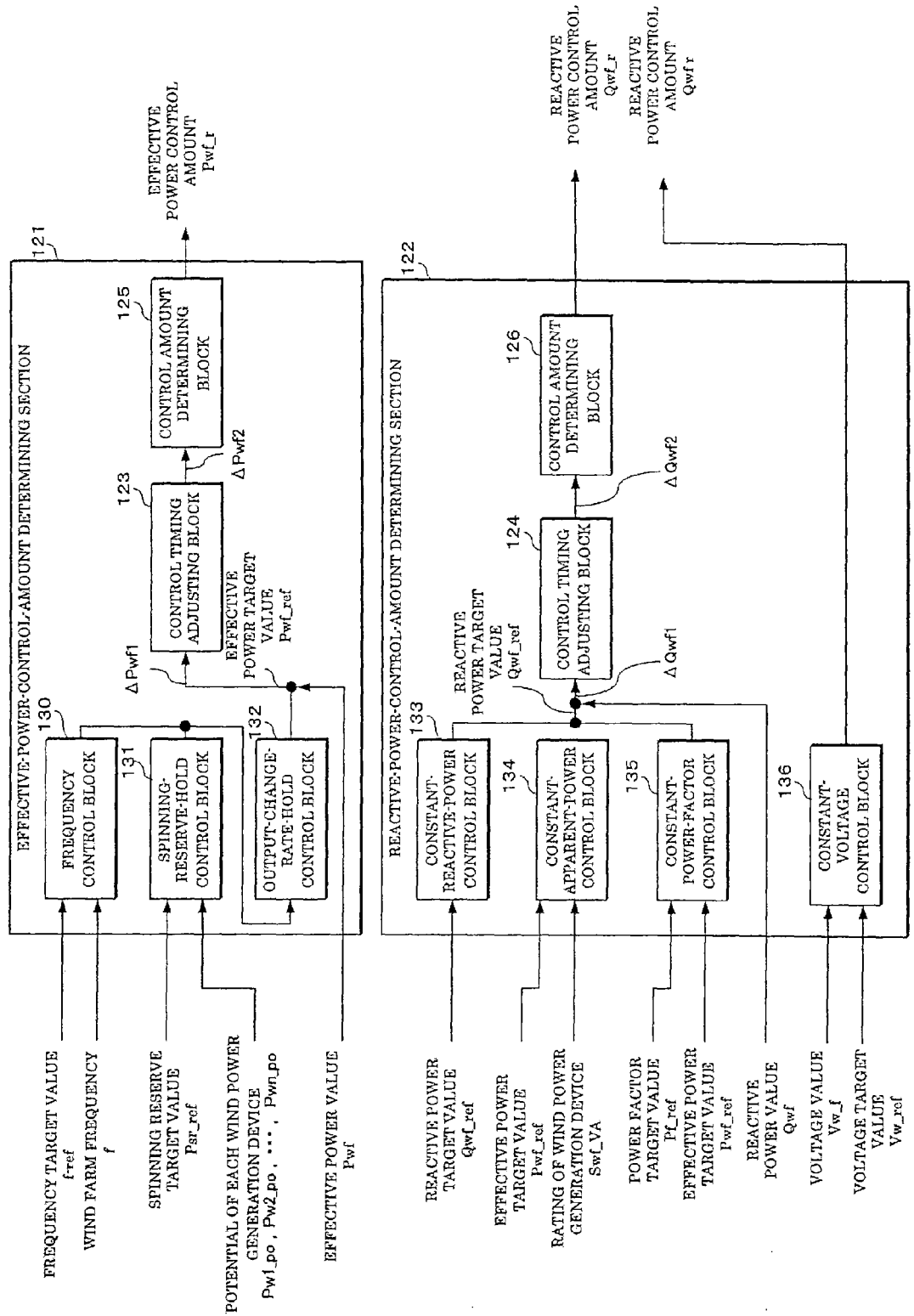
FIG. 14 is a block diagram illustrating a structure of an effective-power-control-amount determining section and that of a reactive-power-control-amount determining section according to a second embodiment.

A wind farm output control device according to a second embodiment will be explained below. According to the second embodiment, the setting method of the effective power target value Pwf_ref and the reactive power target value Qwf_ref of the first embodiment is modified. In this embodiment, the effective power target value Pwf_ref and the reactive power target value Qwf_ref are calculated based on data detected by the wind power generation device 100(1 to n) and data detected at the connection point of the wind farm. FIG. 14 is a block diagram illustrating a wind farm output control device of this embodiment. The same structural element as that of the first embodiment will be denoted by the same reference numeral, and the duplicated explanation thereof will be omitted.

As illustrated in FIG. 14, the effective-power-control-amount determining section 121 includes a frequency control block 130, a spinning-reserve-hold control block 131, and an output-change-rate-hold control block 132.

The frequency control block 130 calculates an effective power target value Pwf_ref1 of the wind farm output having a frequency fluctuation to be within a certain range based on a deviation Δf between a frequency target value f_ref at the connection point of the wind farm output and a frequency f at the connection point of the wind farm output.

The spinning-reserve-hold control block 131 calculates an effective power target value Pwf_ref2 of the wind farm output necessary to hold the spinning reserve of a target value Psr_ref to the effective power target value Pwf_ref of the wind farm output.

The output-change-rate-hold control block 132 performs a control in such a way that an output change rate per a time Td in an effective power Pwf_ref3 obtained by adding the effective power Pwf_ref1 calculated by the frequency control block 130 and the effective power Pwf_ref2 calculated by the spinning-reserve-hold control block 131 does not exceed a preset range ±DPT_ref. The output-change-rate-hold control block 132 sets the effective power target value Pwf_ref3 holding the output change rate as the target value Pwf_ref of the effective power control.

As illustrated in FIG. 14, the reactive-power-control-amount determining section 122 further includes a constant-reactive-power control block 133, a constant-apparent-power control block 134, a constant-power-factor control block 135, and a constant-voltage control block 136. The reactive-power-control-amount determining section 122 determines the control amount Qwf_ref of the reactive power target value based on the calculation result through any one of the constant-reactive-power control block 133, the constant-apparent-power control block 134, and the constant-power-factor control block 135.

The constant-reactive-power control block 133 has a preset target value Qwf_ref0 input thereto, and sets a target value Qwf_ref0 of reactive power.

The constant-apparent-power control block 134 calculates the reactive power target value Qwf_ref1 through a formula (12) based on the effective power target value Pwf_ref and an apparent power target value SwfVA_ref.

[Formula 12]

$$Qwf\_ref1 = -\sqrt{(SwfVA\_ref^2 - Pwf\_ref^2)} \quad (12)$$

The constant-power-factor control block 135 calculates the reactive power target value Qwf_ref2 through a formula (13) based on the effective power target value Pwf_ref and a power factor target value Pf_ref.

[Formula 13]

$$Qwf\_ref2 = -\sqrt{\left(\frac{1-Pf\_ref^2}{Pf\_ref^2} \times Pwf\_ref^2\right)} \quad (13)$$

The reactive-power-control-amount determining section 122 selects any one of the reactive power target values Qwf_ref0 to Qwf_ref2, and sets the selected value as the reactive power target value Qwf_ref.

In addition, the constant-voltage control block 136 calculates a reactive power target value Qwf_r1 based on a deviation ΔVwf between a wind farm voltage target value Vwf_ref and the detected value Vwf both at the connection point in such a way that the reactive power Qwf that is the output by the wind farm becomes within a certain range.

[2-2. Operation]

According to the wind farm output control device of this embodiment employing the above-explained structure, the control amount of the whole wind farm is calculated based on detection data detected at the output point of the wind farm and data detected at the wind power generation devices 100(1 to n). When the control amount of the whole wind farm is calculated, like the foregoing embodiment, the delay components are compensated to adjust the control timing. An explanation will be below given of a calculation of the control amount of the whole wind farm.

(Calculation of Control Amount of Whole Wind Farm)

(1) Setting of Effective Power Target Value Pwf_Ref of Wind Farm

The effective power target value Pwf_ref of the whole wind farm is set based on the calculation results by the frequency control block 130, the spinning-reserve-hold control block 131, and the output-change-rate-hold control block 132.

Figure 15:
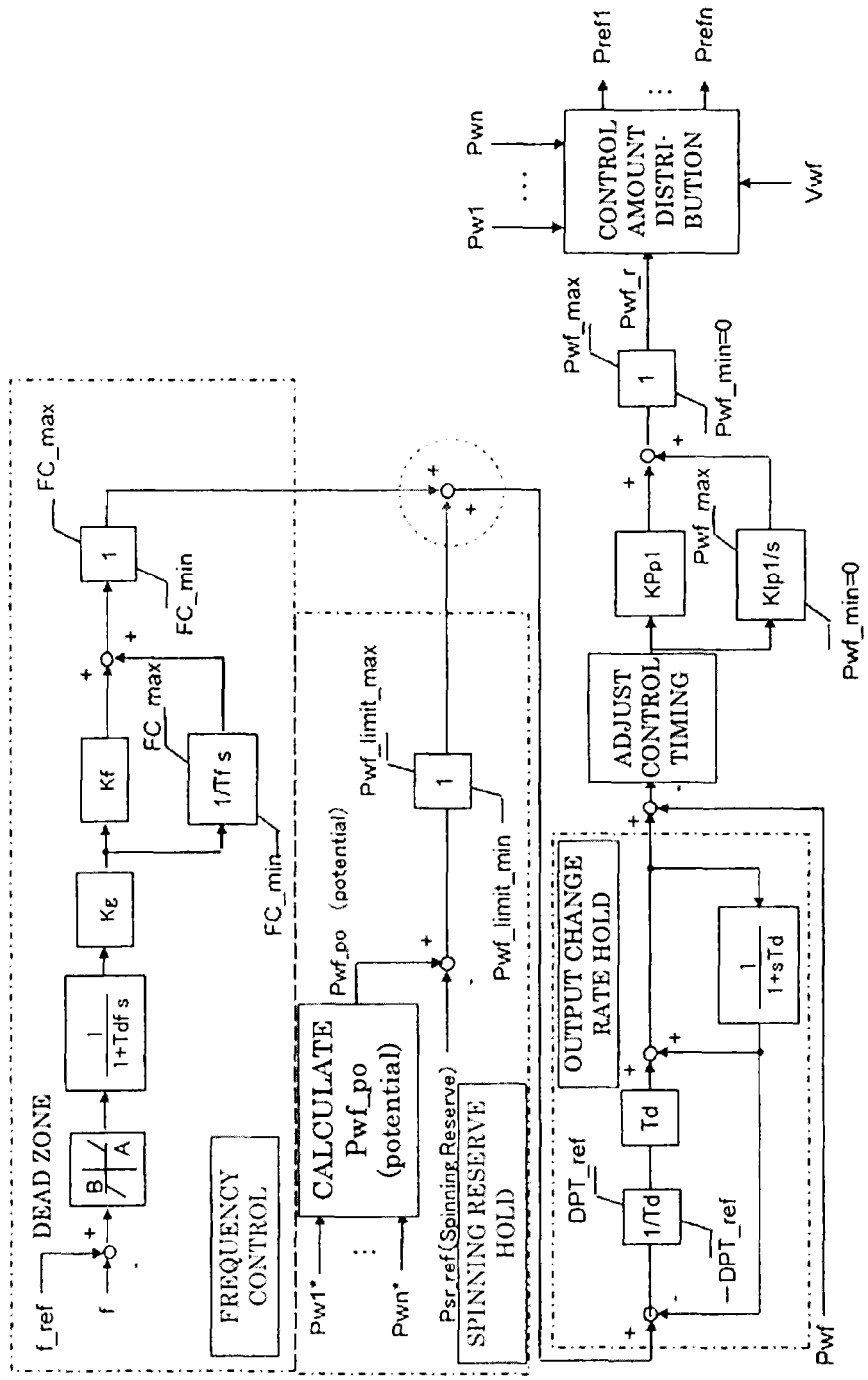
FIG. 15 is a schematic diagram illustrating an outline of an effective-power-control-amount calculation according to the second embodiment.

An operation of the frequency control block 130 will be explained. As illustrated in FIG. 15, the frequency control block 130 calculates a frequency deviation Δf between a frequency target value f_ref at the connection point of the wind farm output and the frequency f at the connection point of the wind farm output. For this deviation Δf, a dead zone having A as an upper limit and B as a lower limit is set. When the deviation Δf has a magnitude exceeding the dead zone, based on the deviation Δf and a speed regulation Kg, the effective power Pwf_ref1 of the wind farm output necessary to dissipate the deviation Δf is calculated. The speed regulation Kg is a preset constant.

To calculate the effective power Pwf_ref1 necessary to dissipate the deviation Δf, a PI control using a proportional gain Kf and an integration gain Kf1 can be applied. In addition, the calculation is performed in such a way that the effective power Pwf_ref1 is located between an uppermost limit FC_max of the frequency control and a lowermost limit FC_min thereof.

An operation of the spinning-reserve-hold control block 131 will be explained. The spinning-reserve-hold control block 131 calculates the potentials Pw1* to Pwn* of the respective wind power generation devices 100(1 to n) in the wind farm, and calculates the total of the potentials Pw1* to Pwn*, thereby calculating the potential Pwf_po of the whole wind farm. Next, a preset spinning reserve Psr_ref of the wind farm is subtracted from the potential Pwf_po thereof, and the effective power target value Pwf_ref is calculated. Still further, the calculation is performed in such a way that the effective power target value Pwf_ref is located between the preset minimum pwf_limit_min and maximum Pwf_limit_max of the wind farm.

An operation of the output-change-rate-hold control block 132. The output-change-rate-hold control block 132 sets the effective power target value Pwf_ref based on an effective power Pwf_ref3 obtained by adding the effective power Pwf_ref1 and the effective power pwf_ref2.

The output-change-rate-hold control block 132 detects a change rate of the effective power target value Pwf_ref3 for each time Td. The output-change-rate-hold control block 132 controls the output change rate of the effective power target value Pwf_ref3 per a time Td so as not to exceed the preset range ±DPT_ref. The output-change-rate-hold control block 132 sets the effective power target value Pwf_ref3 holding the output change rate as the target value Pwf_ref of the control on the effective power.

(2) Setting of Reactive Power Target Value Qwf_Ref of Wind Farm

The target value control amount Qwf_ref of reactive power of the whole wind farm is set based on the calculation results by the constant-reactive-power control block 133, the constant-apparent-power control block 134, and the constant-power-factor control block 135.

Figure 16:
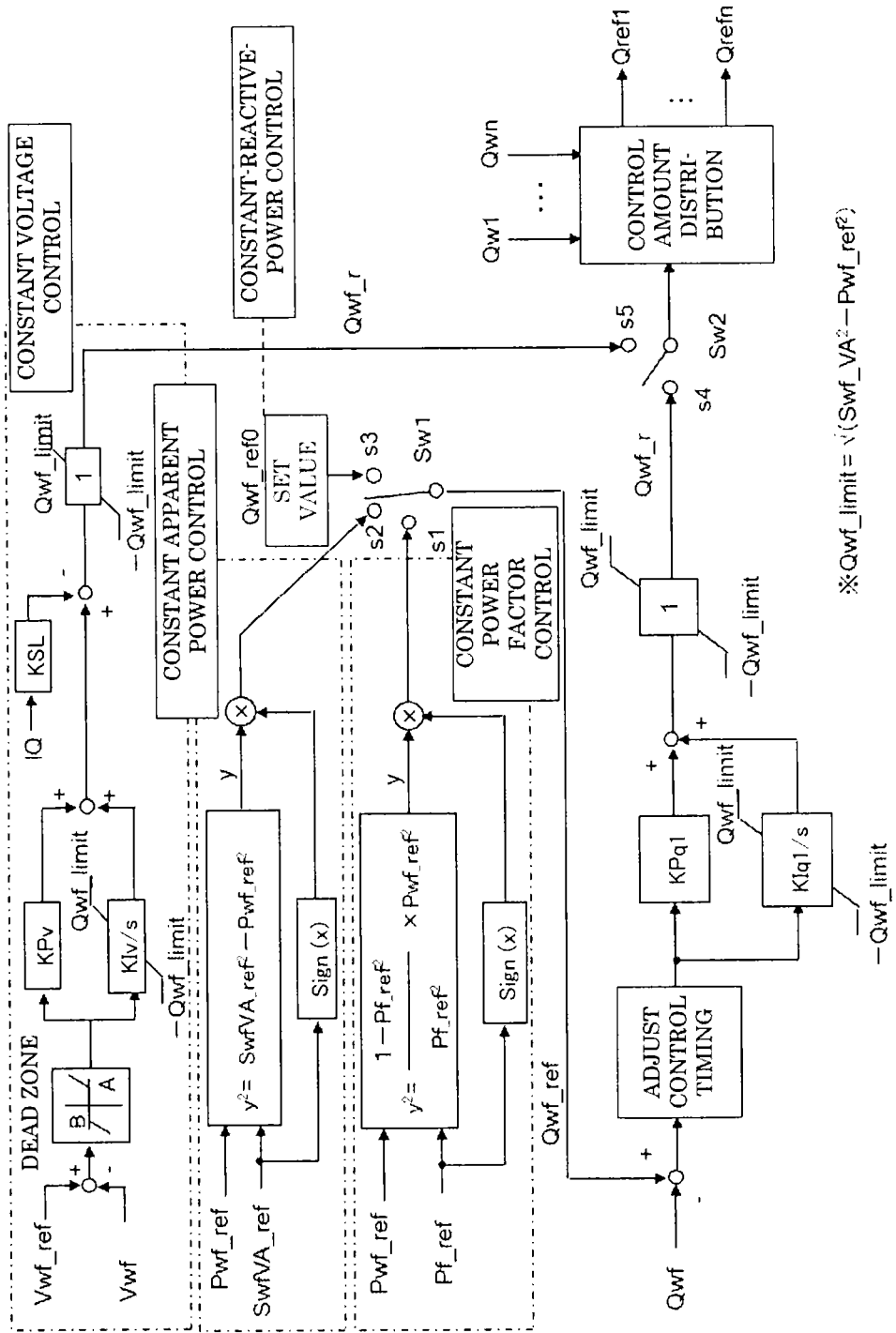
FIG. 16 is a schematic diagram illustrating an outline of a reactive-power-control-amount calculation according to the second embodiment.

An operation of the constant-reactive-power control block 133 will be explained. As illustrated in FIG. 16, when the reactive power is controlled to be within a constant value range, the preset target value Qwf_ref0 is set to be the reactive power target value Qwf_ref. In the constant-reactive-power control by the constant-reactive-power control block 133, in order to suppress a voltage rise and to maintain a power quality, a reactive power constant control is performed within a range of the transformer capacity restriction.

When the constant-apparent-power control block 134 controls the apparent power to be within a constant range, the reactive power target value Qwf_ref1 is calculated based on the effective power target value Pwf_ref and an apparent power target value SwfVA_ref, and is set to be the target value Qwf_ref of the control on the reactive power. In the constant apparent power control by the constant-apparent-power control block 134, in order to ensure a long life of devices like a transformer, the reactive power is adjusted so as to make the apparent power constant in accordance with a change in the effective power.

When the constant-power-factor control block 135 controls, as a power factor control, the power factor to be within a constant range, the reactive power target value Qwf_ref2 is set based on the effective power target value Pwf_ref and a power factor target value Pf_ref. In the power factor control by the constant-power-factor control block 135, in order to improve the power factor at the system side, the reactive power is adjusted in accordance with a change in the effective power so as to make the power factor constant.

(3) Setting o Reactive Power Control Amount Qwf_Ref1 by Constant Voltage Control In addition, according to this embodiment, the constant-voltage control block 136 obtains the reactive power control amount Qwf_r1, which may be selected as the reactive power control amount Qwf_r obtained based on a difference between the target value control amount Qwf_ref and the reactive power Qwf of the wind farm.

The constant-voltage control block 136 calculates a control amount that decreases a deviation between the wind farm voltage target value Vwf_ref and the detected value Vwf both at the connection point. The constant-voltage control block 136 calculates a deviation ΔVwf between the voltage target value Vwf_ref and the voltage detected value Vwf both at the connection point of the wind farm output. For this deviation ΔVwf, a dead zone having A as an upper limit and B as a lower limit is set. When the deviation ΔVwf has a magnitude that exceeds the dead zone, reactive power Qwf_r of the wind farm output necessary to dissipate the deviation ΔVwf is calculated. Note that Kg is a preset constant.

To calculate the reactive power Qwf_r1 necessary to dissipate the deviation ΔVwf, a PI control using a proportional gain KPv and an integration gain Klv/s can be applied. In addition, the calculation is performed in such a way that the reactive power Qwf_r is located between a maximum value Qwf_limit_max of the reactive power outputtable by the wind farm and a minimum value Qwf_limit_min of the reactive power outputtable by the wind farm.

[2-3. Advantageous Effects]

According to this embodiment employing the above-explained structure and operation, in addition to the advantageous effects of the first embodiment, the following advantageous effects can be further accomplished.

(1) The frequency control of the wind farm attributes the system frequency adjustment at the same level as those of hydraulic and thermal power generations.

(2) The wind farm becomes able to control the effective power at a power receiving point in such a way that the output change rate does not exceed a preset value. Hence, the rotation speed of the wind power generation device does not exceed the upper limit and a fast-speed fluctuation can be shut away at the time of interconnection with a commercial system.

(3) The wind farm becomes able to hold the spinning reserve, and control the effective power at the power receiving point in such a way that the output change rate does not exceed the preset value. Hence, when a disturbance like an accident occurs in a commercial system to be interconnected, supplied power to the system can be increased, allowing the wind farm to contribute the system stabilization.

(4) Since the reactive power output by the wind farm is caused to track the target value, the constant apparent power control ensures a long life of devices like a transformer, the constant reactive power control suppresses a voltage rise, thereby maintaining the power quality, and the constant power factor control improves the power factor at the system side.

(5) When the voltage at the connection point of the wind farm is maintained within a constant range and within a possible maximum reactive power outputtable range, power can be supplied without an adverse effect of a voltage fluctuation due to a wind fluctuation to a commercial system to be interconnected with the wind farm.

In addition, according to this embodiment, in order to set the effective power target value Pwf_ref of the wind farm, the combination of the frequency control block 130, the spinning-reserve-hold control block 131, and the output-change-rate-hold control block 132 perform the calculation, but the combination is not limited to this structure. In addition, the reactive power target value Qwf_ref is selected from the calculation results by the constant-reactive-power control block 133, the constant-apparent-power control block 134, and the constant-power-factor control block 135, but the selection method is not limited to this manner. That is, the reactive power target value may be selected from the calculation results by the constant-reactive-power control block 133 and the constant-apparent-power control block 134, or the selection result by the constant-apparent-power control block 134 only may be set as the reactive power target value Qwf_ref. According to this structure, a control matching the needs of the user is enabled.

[3. Other Embodiments]

Several embodiments of the present disclosure were explained in the specification, but those embodiments are merely presented as examples, and are not intended to limit the scope of the present disclosure. More specifically, the present disclosure covers a case in which, in the control amount distributor, simultaneous calculation of the control amount of the effective power distribution amount and the control amount of the reactive power distribution amount is performed. In this case, the control is performed with potential=effective power control amount+reactive power control amount. In addition, a control amount with potential=effective power control amount+reactive power+spinning reserve may be applied. According to such embodiments, the advantageous effects of both first and second embodiments can be accomplished simultaneously.

In addition, in the second embodiment, the explanation was given of a control method by the frequency control block 130, the spinning-reserve-hold control block 131, the output-change-rate-hold control block 132, the constant-reactive-power control block 133, the constant-apparent-power control block 134, the constant-power-factor control block 135, and the constant-voltage control block 136, but a control of the effective power, the spinning reserve, the reactive power, and the voltage through other methods is also within the scope of the present disclosure. The same is true of the holding method of the output change rate.

The above-explained embodiments can be carried out in other various forms, and permit various omissions, replacements, and modifications without departing from the spirit of the present disclosure. Those embodiments and the modifications thereof are within the scope of the present disclosure, and are also within the scope of the subject matter as recited in the appended claims and the equivalent range thereto.

What is claimed is:

1. An output control device for a wind farm including a plurality of wind power generation devices, the output control device comprising:
   a potential estimator configured to estimate an outputtable maximum power amount by each wind power generation device;
   a control amount determiner configured to determine a control amount of the wind farm based on the maximum power amount estimated by the potential estimator;
   a control timing adjuster configured to adjust a control timing of the control amount of the wind farm; and
   a control amount distributor configured to distribute the control amount having undergone the control timing adjustment based on an available power generation amount of each wind power generation device,
   wherein the control amount determiner is configured to determine the control amount based on a deviation between a power target value and a power amount output by the wind farm, and, the maximum power amount; and
   the control timing adjuster is configured to compensate a delay component contained in the deviation,
   wherein the control timing adjuster comprises a delay phase compensator that compensates a delay phase of the control amount.

2. The wind farm output control device according to claim 1, wherein the control timing adjuster comprises a gain adjuster configured to increase or decrease a gain of the control amount.

3. The wind farm output control device according to claim 2, wherein:
the control amount determiner comprises:
a frequency control block configured to calculate the control amount based on a deviation between a preset frequency target value and a frequency of an output by the wind farm;
a spinning-reserve-hold control block calculating the control amount based on a deviation between a preset target value of a spinning reserve and an outputtable power by the wind farm; and
an output-change-rate-hold control block configured to perform a control in such a way that a change rate of a control amount obtained by adding the control amount calculated by the frequency control block and the control amount calculated by the spinning-reserve-hold control block is within a certain range; and
the control amount having undergone the control by the output-change-rate-hold control block is set to be a target value of the effective power.

4. The wind farm output control device according to claim 2, wherein the control amount determiner comprises any one of the followings:
a constant-reactive-power control block configured to set a preset target value of reactive power to be the power target value;
a constant-apparent-power control block calculating the power target value based on a target value of effective power of the wind farm and a rating of each wind power generation device; and
a constant-power-factor control block calculating the power target value based on a preset power factor target value and the target value of the effective power of the wind farm.

5. The wind farm output control device according to claim 1, wherein the control timing adjuster comprises a primary delay processor configured to compensate a primary delay of the control amount.

6. The wind farm output control device according to claim 5, wherein:
the control amount determiner comprises:
a frequency control block configured to calculate the control amount based on a deviation between a preset frequency target value and a frequency of an output by the wind farm;
a spinning-reserve-hold control block calculating the control amount based on a deviation between a preset target value of a spinning reserve and an outputtable power by the wind farm; and
an output-change-rate-hold control block configured to perform a control in such a way that a change rate of a control amount obtained by adding the control amount calculated by the frequency control block and the control amount calculated by the spinning-reserve-hold control block is within a certain range; and
the control amount having undergone the control by the output-change-rate-hold control block is set to be a target value of the effective power.

7. The wind farm output control device according to claim 5, wherein the control amount determiner comprises any one of the followings:
a constant-reactive-power control block configured to set a preset target value of reactive power to be the power target value;
a constant-apparent-power control block calculating the power target value based on a target value of effective power of the wind farm and a rating of each wind power generation device; and
a constant-power-factor control block calculating the power target value based on a preset power factor target value and the target value of the effective power of the wind farm.

8. The wind farm output control device according to claim 1, wherein the control timing adjuster comprises a hunting suppression processor configured to suppress elements affected by vibration contained in the control amount.

9. The wind farm output control device according to claim 8, wherein:
the control amount determiner comprises:
a frequency control block configured to calculate the control amount based on a deviation between a preset frequency target value and a frequency of an output by the wind farm;
a spinning-reserve-hold control block calculating the control amount based on a deviation between a preset target value of a spinning reserve and an outputtable power by the wind farm; and
an output-change-rate-hold control block configured to perform a control in such a way that a change rate of a control amount obtained by adding the control amount calculated by the frequency control block and the control amount calculated by the spinning-reserve-hold control block is within a certain range; and
the control amount having undergone the control by the output-change-rate-hold control block is set to be a target value of the effective power.

10. The wind farm output control device according to claim 8, wherein the control amount determiner comprises any one of the followings:
a constant-reactive-power control block configured to set a preset target value of reactive power to be the power target value;
a constant-apparent-power control block calculating the power target value based on a target value of effective power of the wind farm and a rating of each wind power generation device; and
a constant-power-factor control block calculating the power target value based on a preset power factor target value and the target value of the effective power of the wind farm.

11. The wind farm output control device according to claim 1, wherein the control amount determiner comprises:
a frequency control block configured to calculate the control amount based on a deviation between a preset frequency target value and a frequency of an output by the wind farm;
a spinning-reserve-hold control block calculating the control amount based on a deviation between a preset target value of a spinning reserve and an outputtable power by the wind farm; and
an output-change-rate-hold control block configured to perform a control in such a way that a change rate of a control amount obtained by adding the control amount calculated by the frequency control block and the control amount calculated by the spinning-reserve-hold control block is within a certain range; and the control amount having undergone the control by the output-change-rate-hold control block is set to be a target value of the effective power.

12. The wind farm output control device according to claim 11, wherein the control amount determiner comprises any one of the followings:
   a constant-reactive-power control block configured to set a preset target value of reactive power to be the power target value;
   a constant-apparent-power control block calculating the power target value based on a target value of effective power of the wind farm and a rating of each wind power generation device; and
   a constant-power-factor control block calculating the power target value based on a preset power factor target value and the target value of the effective power of the wind farm.

13. The wind farm output control device according to claim 1, wherein the control amount determiner comprises any one of the followings:
   a constant-reactive-power control block configured to set a preset target value of reactive power to be the power target value;
   a constant-apparent-power control block calculating the power target value based on a target value of effective power of the wind farm and a rating of each wind power generation device; and
   a constant-power-factor control block calculating the power target value based on a preset power factor target value and the target value of the effective power of the wind farm.

14. An output control method for a wind farm including a plurality of wind power generation devices, the output control method comprising:
   a potential estimating step for estimating an outputtable maximum power amount by each wind power generation device;
   a control amount determining step for determining a control amount of the wind farm based on the maximum power amount estimated through the potential estimating step;
   a control timing adjusting step for adjusting a control timing of the control amount of the wind farm; and
   a control amount distributing step for distributing the control amount having undergone the control timing adjustment based on an available power generation amount of each wind power generation device,
   wherein in the control amount determining step, the control amount is determined based on a deviation between a power target value and a power amount output by the wind farm, and, the maximum power amount, and
   in the control timing adjusting step, compensating a delay component contained in the deviation by compensating a delay phase of the control amount.

15. A non-transitory computer readable medium storing a control program of controlling, through a computer an output control device for a wind farm comprising a plurality of wind power generation devices, the control program causing the computer to execute:
   a potential estimating step for estimating an outputtable maximum power amount by each wind power generation device;
   a control amount determining step for determining a control amount of the wind farm based on the maximum power amount estimated through the potential estimating step;
   a control timing adjusting step for adjusting a control timing of the control amount of the wind farm; and
   a control amount distributing step for distributing the control amount having undergone the control timing adjustment based on an available power generation amount of each wind power generation device,
   wherein in the control amount determining step, the control amount is determined based on a deviation between a power target value and a power amount output by the wind farm, and, the maximum power amount, and
   in the control timing adjusting step, compensating a delay component contained in the deviation by compensating a delay phase of the control amount.

* * * * *